US011257132B1

(12) United States Patent
Cornelison et al.

(10) Patent No.: US 11,257,132 B1
(45) Date of Patent: Feb. 22, 2022

(54) PROCESSING SYSTEMS AND METHODS HAVING A MACHINE LEARNING ENGINE FOR PROVIDING A SURFACE DIMENSION OUTPUT

(71) Applicant: Allstate Insurance Company, Northbrook, IL (US)

(72) Inventors: Michael T. Cornelison, LaGrange Highlands, IL (US); Anurag Sharma, Buffalo Grove, IL (US); Daniel Brickman, Chicago, IL (US); David M. Zahn, Lake Villa, IL (US); Andrew Daniels, Columbus, OH (US); Pinal Patel, Libertyville, IL (US); David L. Gilkison, Libertyville, IL (US); Steven Genc, Hainesville, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 606 days.

(21) Appl. No.: 15/971,294

(22) Filed: May 4, 2018

(51) Int. Cl.
*G06Q 40/08* (2012.01)
*G06Q 30/02* (2012.01)
(Continued)

(52) U.S. Cl.
CPC ........... *G06Q 30/0283* (2013.01); *G06N 3/02* (2013.01); *G06N 20/00* (2019.01); *G06Q 10/20* (2013.01);
(Continued)

(58) Field of Classification Search
CPC .... G06Q 40/08; G06Q 30/0283; G06Q 10/20; G01N 21/9515; G06T 1/00; G06T 7/00;
(Continued)

(56) References Cited

U.S. PATENT DOCUMENTS

| 5,504,674 A | 4/1996 | Chen et al. |
| 5,655,085 A | 8/1997 | Ryan et al. |

(Continued)

FOREIGN PATENT DOCUMENTS

| CA | 2303724 A1 | 9/2001 |
| EP | 1220131 A1 | 7/2002 |

(Continued)

OTHER PUBLICATIONS

"An Intro to Computer Vision and It's Impact on Insurance Claims and Analytics", Oct. 5, 2017, Jul. 1, 2016, Hemi Ventures; medium.com, 6 pages (Year: 2016).*

(Continued)

*Primary Examiner* — Shannon S Campbell
*Assistant Examiner* — Freda A Nelson
(74) *Attorney, Agent, or Firm* — Foley & Lardner LLP

(57) ABSTRACT

Systems and apparatuses for generating surface dimension outputs are provided. The system may collect an image from a mobile device. The system may analyze the image to determine whether they comprise one or more standardized reference objects. Based on analysis of the image and the one or more standardized reference objects, the system may determine a surface dimension output. The system may determine one or more settlement outputs and one or more repair outputs for the driver based on the surface dimension output.

20 Claims, 8 Drawing Sheets

(51) Int. Cl.
  *G06Q 10/00* (2012.01)
  *G06N 3/02* (2006.01)
  *G06T 7/13* (2017.01)
  *G06N 20/00* (2019.01)
  *G06K 9/00* (2022.01)

(52) U.S. Cl.
  CPC ............ *G06T 7/13* (2017.01); *G06K 9/00234* (2013.01); *G06T 2210/12* (2013.01)

(58) Field of Classification Search
  CPC ......... G06T 7/001; G06T 7/0014; G06T 7/13; G06T 2210/12
  USPC ...................................................... 705/4, 400
  See application file for complete search history.

(56) References Cited

U.S. PATENT DOCUMENTS

| | | | |
|---|---|---|---|
| 5,697,001 | A | 12/1997 | Ring et al. |
| 6,611,807 | B1 | 8/2003 | Bernheim et al. |
| 6,678,685 | B2 | 1/2004 | McGill et al. |
| 6,829,584 | B2 | 12/2004 | Loveland |
| 6,851,611 | B1 | 2/2005 | Shaw-Sinclair |
| 6,904,410 | B1 | 6/2005 | Weiss et al. |
| 7,184,975 | B2 | 2/2007 | Ikeda |
| 7,343,310 | B1 | 3/2008 | Stender |
| 7,424,473 | B2 | 9/2008 | Orton, III et al. |
| 7,551,849 | B1 | 6/2009 | Abad |
| 7,568,200 | B2 | 7/2009 | Weiss |
| 7,765,118 | B1 | 7/2010 | Bohanek |
| 7,801,750 | B1 | 9/2010 | Wallach et al. |
| 7,809,587 | B2 | 10/2010 | Dorai et al. |
| 7,899,823 | B1 | 3/2011 | Trandal et al. |
| 7,941,330 | B1 | 5/2011 | Buentello et al. |
| 7,953,615 | B2 | 5/2011 | Aquila et al. |
| 8,041,636 | B1 | 10/2011 | Hunter et al. |
| 8,095,391 | B2 | 1/2012 | Obora et al. |
| 8,140,421 | B1 | 3/2012 | Humphries et al. |
| 8,185,463 | B1 | 5/2012 | Ball |
| 8,219,558 | B1 | 7/2012 | Trandal et al. |
| 8,266,017 | B1 | 9/2012 | Dearlove et al. |
| 8,655,683 | B2 | 2/2014 | Grundel et al. |
| 8,712,893 | B1 | 4/2014 | Brandmaier et al. |
| 8,756,085 | B1 | 6/2014 | Plummer et al. |
| 8,977,033 | B1 | 3/2015 | Maurer et al. |
| 9,002,719 | B2 | 4/2015 | Tofte |
| 9,082,015 | B2 | 7/2015 | Christopulos et al. |
| 9,129,276 | B1 | 9/2015 | Fasoli et al. |
| 9,317,753 | B2 | 4/2016 | Saptharishi et al. |
| 9,519,734 | B2 | 12/2016 | Randolph |
| 9,605,704 | B1 | 3/2017 | Humphries et al. |
| 9,633,146 | B2 | 4/2017 | Plummer et al. |
| 9,672,567 | B2 | 6/2017 | Thomas et al. |
| 9,723,251 | B2* | 8/2017 | Slotky .................... H04N 5/77 |
| 9,841,311 | B2* | 12/2017 | McCloskey ............ G01B 11/00 |
| 9,846,915 | B2* | 12/2017 | Howe ................ G06K 9/00637 |
| 10,223,750 | B1 | 3/2019 | Loo et al. |
| 10,706,321 | B1* | 7/2020 | Chen .................... G06T 3/4007 |
| 10,832,332 | B1 | 11/2020 | Spader et al. |
| 2002/0002475 | A1 | 1/2002 | Freedman et al. |
| 2002/0035522 | A1 | 3/2002 | Pilcher |
| 2002/0116163 | A1 | 8/2002 | Loveland |
| 2002/0143564 | A1 | 10/2002 | Webb et al. |
| 2002/0184107 | A1 | 12/2002 | Tsuda et al. |
| 2003/0061104 | A1 | 3/2003 | Thomson et al. |
| 2004/0153346 | A1 | 8/2004 | Grundel et al. |
| 2004/0204966 | A1 | 10/2004 | Duffey et al. |
| 2005/0027571 | A1 | 2/2005 | Gamarnik et al. |
| 2005/0060236 | A1 | 3/2005 | Iulo |
| 2005/0197907 | A1 | 9/2005 | Weiss |
| 2005/0267900 | A1 | 12/2005 | Ahmed et al. |
| 2006/0161462 | A1 | 7/2006 | Sharma |
| 2006/0178902 | A1 | 8/2006 | Vicars et al. |
| 2006/0253351 | A1 | 11/2006 | Keaney |
| 2006/0259380 | A1 | 11/2006 | Milstein et al. |
| 2006/0282304 | A1 | 12/2006 | Bedard et al. |
| 2006/0282342 | A1 | 12/2006 | Chapman |
| 2006/0293928 | A1 | 12/2006 | Schumacher et al. |
| 2007/0011033 | A1 | 1/2007 | Atkinson et al. |
| 2007/0143123 | A1 | 6/2007 | Goldberg et al. |
| 2008/0065427 | A1 | 3/2008 | Helitzer et al. |
| 2009/0024420 | A1 | 1/2009 | Winkler |
| 2009/0138560 | A1 | 5/2009 | Stahl |
| 2009/0164304 | A1 | 6/2009 | Otto et al. |
| 2009/0171813 | A1 | 7/2009 | Byrne et al. |
| 2009/0177499 | A1 | 7/2009 | Westerberg et al. |
| 2009/0187468 | A1 | 7/2009 | Krech |
| 2009/0265193 | A1 | 10/2009 | Collins et al. |
| 2009/0307017 | A1 | 12/2009 | Mandessian |
| 2009/0319362 | A1 | 12/2009 | Dashnaw |
| 2009/0326989 | A1 | 12/2009 | Schmitt et al. |
| 2010/0076794 | A1 | 3/2010 | Seippel |
| 2010/0103241 | A1 | 4/2010 | Linaker |
| 2010/0131308 | A1 | 5/2010 | Collopy et al. |
| 2010/0241463 | A1 | 9/2010 | Corben et al. |
| 2010/0312584 | A1 | 12/2010 | Bradshaw et al. |
| 2011/0057789 | A1 | 3/2011 | Cai et al. |
| 2011/0161117 | A1 | 6/2011 | Busque et al. |
| 2011/0218875 | A1 | 9/2011 | Scruton et al. |
| 2011/0238451 | A1 | 9/2011 | Bazzani et al. |
| 2011/0288891 | A1 | 11/2011 | Zaid et al. |
| 2011/0314038 | A1 | 12/2011 | Pacella |
| 2011/0320222 | A1 | 12/2011 | Fini et al. |
| 2011/0320322 | A1 | 12/2011 | Roslak et al. |
| 2012/0016695 | A1 | 1/2012 | Bernard et al. |
| 2012/0036033 | A1 | 2/2012 | Seergy et al. |
| 2012/0042253 | A1 | 2/2012 | Priyadarshan et al. |
| 2012/0047082 | A1 | 2/2012 | Bodrozic |
| 2012/0095783 | A1 | 4/2012 | Buentello et al. |
| 2012/0310675 | A1 | 12/2012 | Binder |
| 2013/0013344 | A1 | 1/2013 | Ernstberger et al. |
| 2013/0185100 | A1 | 7/2013 | Allu |
| 2013/0290033 | A1 | 10/2013 | Reeser et al. |
| 2013/0317860 | A1 | 11/2013 | Schumann, Jr. |
| 2014/0067430 | A1 | 3/2014 | Dardick et al. |
| 2014/0100889 | A1 | 4/2014 | Tofte |
| 2014/0180725 | A1 | 6/2014 | Ton-That et al. |
| 2014/0188522 | A1 | 7/2014 | Fini |
| 2015/0025915 | A1 | 1/2015 | Lekas |
| 2015/0228028 | A1 | 8/2015 | Friedman |
| 2015/0332407 | A1 | 11/2015 | Wilson, II et al. |
| 2016/0171622 | A1 | 6/2016 | Perkins et al. |
| 2016/0284084 | A1* | 9/2016 | Gurcan ................. G06T 7/0016 |
| 2016/0335727 | A1 | 11/2016 | Jimenez |
| 2017/0148101 | A1 | 5/2017 | Franke et al. |
| 2017/0221110 | A1 | 8/2017 | Sullivan et al. |
| 2017/0270650 | A1 | 9/2017 | Howe et al. |
| 2017/0323319 | A1 | 11/2017 | Rattner et al. |
| 2017/0330207 | A1 | 11/2017 | Labrie et al. |
| 2018/0260793 | A1* | 9/2018 | Li ........................... G06T 7/001 |
| 2019/0108396 | A1* | 4/2019 | Dal Mutto ............. G06T 7/174 |

FOREIGN PATENT DOCUMENTS

| | | | | |
|---|---|---|---|---|
| WO | | 2006076566 A1 | 7/2006 | |
| WO | | 2006122343 A1 | 11/2006 | |
| WO | | 2013144772 A1 | 10/2013 | |
| WO | WO-2017176304 A1 * | | 10/2017 | ........... G06K 9/4609 |
| WO | | 2018055340 A1 | 3/2018 | |

OTHER PUBLICATIONS

Adrian Rosebrock "Measuring size of objects in an image with OpenCV" pyimagesearch https://www.pyimagesearch.com/2016/03/28/measuring-size-of-objects-in-an-image-with-opencv/ pp. 1-72, Mar. 28, 2016.
"Hover Apps for Insurance Adjusters" Hover https://hover.to/apps-insurance-adjusters/ pp. 1-5, website visited Sep. 14, 2018.
"The Spex Field App—Features" Spex https://spexreport.com/features/ pp. 1-6, website visited Sep. 14, 2018.
Sep. 28, 2018—U.S. Non-Final Office Action—U.S. Appl. No. 13/608,752.

(56) References Cited

OTHER PUBLICATIONS

Oct. 18, 2018—U.S. Notice of Allowance—U.S. Appl. No. 14/032,709.
"Property & Casualty Insurance Claims and Underwriting Management" https://www.pantoninc.com/insurance.html website visited May 4, 2018, pp. 1-5.
Franklin Zhao et al. "Deep Learning based Structural Damage Detection" https://github.com/QinganZhao/Deep-Learning-based-Structural-Damage-Detection Jun. 2017, pp. 1-8.
"Accurence—SettleAssist" https://www.accurence.com/carriers website visited May 4, 2018, pp. 1-6.
Karoon Rashedi Nia et al. "Building Damage Assessment Using Deep Learning and Ground-Level Image Data" https://www.cs.sfu.ca/~mori/research/papers/rashedi-nia-crv2017.pdf website visited May 4, 2018, pp. 1-8.
"Grayscale" Wikipedia https://en.wikipedia.org/wiki/Grayscale#Converting_color_to_grayscale website visited May 4, 2018, pp. 1-6.
Kyle Switch Plates https://www.kyleswitchplates.com/switch-plate-size-reference-information/ website visited May 4, 2018, pp. 1-13.
Mar. 22, 2019—U.S. Final Office Action—U.S. Appl. No. 13/608,752.
Sep. 17, 2020—U.S. Non-Final Office Action—U.S. Appl. No. 13/608,760.
Dec. 21, 2018—U.S. Non-Final Office Action—U.S. Appl. No. 14/065,006.
Oct. 29, 2020—U.S. Non-Final Office Action—U.S. Appl. No. 16/251,420.
Jul. 1, 2019—U.S. Notice of Allowance—U.S. Appl. No. 14/065,006.
Final Office Action from U.S. Appl. No. 13/608,752; dated Mar. 31, 2014.
Final Office Action from U.S. Appl. No. 13/608,760; dated Jan. 14, 2014.
Final Office Action from U.S. Appl. No. 13/608,765; dated Feb. 28, 2014.
"Create a Home Inventory for Insurance", houselogic; Mar. 6, 2012; http://www.houselogic.com/home-advice/home-inventories/home-inventory-for-insurance/.
"Estimate Your Home Value to Match Coverage Limits", Safeco Insurance, A Liberty Mutual Company; Mar. 15, 2012; http://www.safeco.com/insurance-101/consumer-tips/your-home/insurance-to-value.
"Creating a Home Inventory", State Farm Insurance; Mar. 6, 2012; learningcenter.statefarm.com/residence/insurance-2/creating-a-home-inventory/.
Know Your StuffÂ®—Home Inventory; Mar. 6, 2012; https://www.knowyourstuff.org/iii/login.html.
"Mac App Store is the simplest way to find and download for your MAC"; Mar. 6, 2012; itunes.apple.com/us/app/home-iventory/id413564952?mt=12.
"Will Social Media Change the Insurance Industry?" Seeking Alpha Î±; Mar. 6, 2012; seekingalpha.com/article/255962-will-social-media-change-the-insurance-industry.
"Home Manager Benefits", Home Inventory Software; Kaizen Software Solutions; Mar. 6, 2012; https://www.kzsoftware.com/products/home-inventory-software/.
"How Does It Work?" Record It Home & Business Services; 2011; https://www.RecordItHBS.com.
"Household and Personal Property Inventory Book", College of Agricultural, Consumer and Environmental Sciences; 1997; pp. 1-61.
"Protect Yourself by Conducting a Home Inventory"; 2010; David Machost Garrett Insurance.
Home Inventory Software Review 2012 Asset Inventory Management Software Home Inventory . . . Mar. 6, 2012; home-inventory-software-review.toptenreviews.com.
MyHome Pro: Home Inventory—Apps on Android Market; Mar. 6, 2012; https://marekt.android.com/details?id=com.accesslane.myhome.
"Mobile Phone Insurance" Mobile haggling Accessibility; 2008; (http://www.moneysavingexpert.com/accessibility).
BommerangIt: World's leading Lost and Found Service, asset Protection, Asset Tracking, Luggage; Mar. 6, 2012; https://www.bommerangit.com.
"GIO It's a trust thing"; Home and Contents Insurance; Home Contents Insurance; GIO; Mar. 6, 2012; https://www.gio.com.au/home-insurance/home-contents-insurance.
Homeowners Insurance—Insure Your Home with State Farm; Mar. 6, 2012; https://www.statefarm.com/insurance/homeowners/homeowners.asp.
Home and Renters Insurance; Country Financial; Mar. 6, 2012; https://www.countryfinancial.com/SiteController?url=/insuranceInvestments/homeInsurance.
Non-Final Office Action from U.S. Appl. No. 13/608,765; dated Nov. 12, 2013.
Non-Final Office Action from U.S. Appl. No. 13/608,752; dated Oct. 15, 2013.
Non-Final Office Action from U.S. Appl. No. 13/608,760; dated Aug. 29, 2013.
Non-Final Office Action dated on Dec. 16, 2014 in related U.S. Appl. No. 14/032,709.
Non-Final Office Action dated Oct. 7, 2014 in related U.S. Appl. No. 13/608,760.
Non-Final Office Action dated May 20, 2015 in U.S. Appl. No. 13/608,765.
Office Action dated May 26, 2015 in U.S. Appl. No. 14/032,709.
AllIstate Digital Locker https://www.allstate.com/mobile/digital-locker.aspx site last visited Jul. 29, 2015.
"Know Your Stuff Mobile Apps" https://www.knowyourstuff.org/iii/viewOnlyNoLogin.html?page=front_iphone site, last visited Aug. 18, 2015.
Final Rejection dated Oct. 5, 2015 in U.S. Appl. No. 13/608,765.
Non Final Office Action dated Sep. 30, 2015 in U.S. Appl. No. 13/608,752.
Non-Final Office Action dated Nov. 2, 2015 in U.S. Appl. No. 13/608,760.
Nov. 27, 2015—U.S. Non Final Office Action—U.S. Appl. No. 14/065,006.
Apr. 18, 2016—U.S. Non Final Office Action—U.S. Appl. No. 14/032,709.
Jun. 10, 2016—U.S. Office Action—U.S. Appl. No. 14/065,006.
Jul. 21, 2016—U.S. Office Action—U.S. Appl. No. 13/608,752.
Aug. 1, 2016—U.S. Final Office Action—U.S. Appl. No. 13/608,760.
Aug. 24, 2016—U.S. Office Action—U.S. Appl. No. 14/032,709.
Sep. 28, 2016—U.S. Final Office Action—U.S. Appl. No. 14/065,006.
Dec. 1, 2016—U.S. Non-Final Office Action—U.S. Appl. No. 13/608,760.
Feb. 9, 2017—U.S. Office Action—U.S. Appl. No. 14/032,709.
Mar. 7, 2017—U.S. Non-Final Office Action—U.S. Appl. No. 13/608,752.
Jul. 5, 2017—U.S. Final Office Action—U.S. Appl. No. 13/608,760.
Jul. 21, 2017—U.S. Non-Final Office Action—U.S. Appl. No. 14/065,006.
Aug. 8, 2017—U.S. Final Office Action—U.S. Appl. No. 14/032,709.
Sep. 18, 2017—U.S. Final Office Action—U.S. Appl. No. 13/608,752.
Dec. 5, 2017—U.S. Final Office Action—U.S. Appl. No. 14/065,006.
Mar. 26, 2018—U.S. Non-Final Office Action—U.S. Appl. No. 13/608,760.
Apr. 4, 2018—U.S. Non-Final Office Action—U.S. Appl. No. 14/032,709.
Daniel Keir "What role is image recognition technology poised to play for insurance?" Hartford Insurtech Hub https://hartfordinsurtechhub.com/role-image-recognition-technology-poised-play-insurance/ pp. 1-4, Mar. 9, 2018.
May 22, 2020—U.S. Notice of Allowance—U.S. Appl. No. 13/608,752.
"Spotlight: The Rise of the Smart Phone", by Pei Zheng and Lionel M. Ni, IEEE Distributed Systems Online 1541-4922, Copyright 2006, Published by the IEEE Computer Society vol. 7, No. 3; Mar. 2006. (Year: 2006).
Jan. 7, 2021—U.S. Non-Final Office Action—U.S. Appl. No. 16/131,320.
Feb. 19, 2021—U.S. Final Office Action—U.S. Appl. No. 16/251,420.
Feb. 19, 2021—U.S. Final Office Action—U.S. Appl. No. 13/608,760.

(56) References Cited

OTHER PUBLICATIONS

Apr. 29, 2021—U.S. Non-Final Office Action—U.S. Appl. No. 16/251,420.
May 17, 2021—U.S. Non-Final Office Action—U.S. Appl. No. 16/662,934.
Nia & Mori, "Building Damage Assessment Using Deep Learning and Ground-Level Image Data," 14th Conference on Computer and Robot Vision (CRV), 8 pages (2017).

* cited by examiner

US 11,257,132 B1

PROCESSING SYSTEMS AND METHODS HAVING A MACHINE LEARNING ENGINE FOR PROVIDING A SURFACE DIMENSION OUTPUT

FIELD OF ART

Aspects of the disclosure relate to processing systems. In particular, aspects of the disclosure relate to processing systems having a machine learning engine and machine learning datasets to generate surface dimension outputs.

BACKGROUND

Mobile devices comprise cameras, or other image capturing devices, that may be used to collect images associated with various objects. For instance, cameras or other image capturing devices may be used to capture images or objects, devices, homes, vehicles, or portions thereof, that have been damaged. Once the images are collected, it may be difficult to determine the actual size of the damaged item, portion, or other objects in the images without placing a reference object (e.g., an object having a known size, shape, dimension, or the like) into the camera frame. Accordingly, it would be advantageous to instruct a mobile device to capture images including a standardized reference object, and to analyze the standardized reference object to generate surface dimension outputs. This may improve image processing associated with evaluating damage.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Methods, systems, and non-transitory computer-readable media are described herein. In some embodiments an image analysis and device control system including a processor may transmit, to a mobile device, an instruction to capture at least one image. Further, the image analysis and device control system may receive the at least one image. In addition, the image analysis and device control system may use the one or more machine learning algorithms to determine a standardized reference object output comprising an indication that the at least one image comprises a standardized reference object. In some arrangements, the image analysis and device control system may determine, based on an actual standardized reference object dimension output and/or a standardized reference object pixel dimension output, a ratio output comprising a correlation between the actual standardized reference object dimension output and the standardized reference object pixel dimension output. Further, the image analysis and device control system may determine, using edge detection, a surface boundary output comprising an indication of boundaries of a surface comprising the standardized reference object. In some examples, the image analysis and device control system may determine a surface pixel dimension output comprising pixel dimensions for the surface. Additionally or alternatively, the image analysis and device control system may determine, based on the ratio output and the surface pixel dimension output, an actual surface dimension output comprising actual dimensions for the surface. Subsequently, the image analysis and device control system may transmit, to the mobile device, the actual surface dimension output.

In some examples, the image analysis and device control system may receive, from the mobile device, a damage indication output, and may transmit the instruction to capture the at least one image in response to receiving the damage indication output.

In some instances, the instruction to capture the at least one image may comprise a link to download a damage processing application.

In some instances, the actual standardized reference object dimension output may comprise an indication of actual dimensions for the standardized reference object and the standardized reference object pixel dimension output may comprise pixel dimensions for the standardized reference object.

In some examples, the standardized reference object may comprise at least one of: a light switch or switch plate, an outlet or outlet plate, a light bulb, a can light (e.g. recessed lighting or the like), a phone outlet, a data jack, a baseboard, a nest, a smoke detector, a kitchen sink, a faucet, a stove, a dishwasher, a floor tile, hot and cold faucet handles, a heat vent, a key hole, a door handle and a door frame, a door handle and a deadbolt (e.g. a distance between the door handle and the deadbolt may be a known dimension used to identify a size of another object, surface, or the like), a door hinge, a stair, a railing, a table, a chair, a bar stool, a toilet, and a cabinet, and the like. In some examples, a known dimension associated with the standardized reference object may be used to identify a size of another object, surface, and the like. For example a distance between hot and cold faucet handles, a distance between a door handle and a door frame or deadbolt, a stair height, a railing height, a table height, a chair height, a cabinet height and the like may be used as a reference dimension and compared to a dimension of, for example, damaged property, to determine the size of the damaged property.

In some instances, the image analysis and device control system may transmit, to the mobile device, an instruction to prompt for a room indication input comprising an indication of a type of room in which the at least one image was captured. Further, the image analysis and device control system may receive, from the mobile device, the room indication input. In some arrangements, the image analysis and device control system may determine, based on the room indication input and using a database of stored room identities, a room indication output. Additionally or alternatively, the image analysis and device control system may determine, based on the room indication output, a plurality of standardized reference objects.

In some examples, the image analysis and device control system may determine the standardized reference object output by determining that the at least one image comprises at least one of the plurality of standardized reference objects.

In some examples, the image analysis and device control system may transmit, to the mobile device, an acceptability output comprising an indication that the at least one image comprises the standardized reference object and that the at least one image is acceptable.

In some instances, the image analysis and device control system may transmit, to the mobile device, an instruction to prompt a user for confirmation that the at least one image contains the standardized reference object. Next, the image analysis and device control system may receive, from the mobile device, a confirmation output comprising an indication of the confirmation.

In some examples, the image analysis and device control system may determine, using the one or more machine learning algorithms, that the at least one image comprises the standardized reference object by determining, based on the indication of the confirmation, that the at least one image comprises the standardized reference object.

In some instances, the image analysis and device control system may receive a second image. Further, the image analysis and device control system may determine, using the one or more machine learning algorithms, that the second image does not comprise the standardized reference object. In some examples, the image analysis and device control system may transmit, to the mobile device and in response to determining that the second image does not comprise the standardized reference object, an instruction to prompt a user to place a reference object in front of the surface and to capture a new image of the surface using the mobile device. Additionally or alternatively, the image analysis and device control system may receive, from the mobile device, the new image. The image analysis and device control system may analyze, using the reference object, the new image.

In some examples, the image analysis and device control system may convert, prior to analyzing the at least one image, the at least one image to greyscale.

In some instances, the image analysis and device control system may determine, using the one or more machine learning algorithms, the standardized reference object output by: determining, by the image analysis and device control system and using the one or more machine learning algorithms, a plurality of bounding boxes comprising the at least one image; reducing, by the image analysis and device control system, image quality of a first bounding box of the plurality of bounding boxes; adjusting, by the image analysis and device control system, dimensions of the first bounding box to match predetermined dimensions for a neural network resulting in an adjusted first bounding box, wherein the adjusting the dimensions of the first bounding box comprises transposing the first bounding box on top of a black image that comprises the predetermined dimensions; and inputting, by the image analysis and device control system and into the neural network, the adjusted first bounding box for analysis by the one or more machine learning algorithms to determine whether the at least one image comprises the standardized reference object.

In some examples, the at least one image may comprise an image of damage in a home and the surface may comprise one of: a wall, a ceiling, and a floor.

In some instances, the image analysis and device control system may determine a damage size output comprising an indication of a size of the damage. Further, the image analysis and device control system may determine, using the one or more machine learning algorithms, based on the damage size output, and based on a type of the damage, an estimated cost to repair the damage. Next, the image analysis and device control system may determine, based on the estimated cost to repair the damage, a settlement output comprising an automated settlement amount. In addition, the image analysis and device control system may transmit, to the mobile device, an instruction to cause display of the settlement output.

In some examples, the image analysis and device control system may determine the estimated cost by comparing, using the one or more machine learning algorithms, the damage to other previously determined instances of damage and repair costs associated with each of the other previously determined instances of damage.

In some instances, the image analysis and device control system may determine, based on the type of the damage, repair service recommendations and availability. Further, the image analysis and device control system may transmit, to the mobile device, repair output comprising an indication of the repair service recommendations and availability. In addition, the image analysis and device control system may transmit, to the mobile device and along with the repair output, an instruction to cause display of the repair service recommendations and availability.

In some examples, the image analysis and device control system may determine the damage size output by: transmitting, by the image analysis and device control system and to the mobile device, an instruction to display the at least one image and to display a prompt for a user to trace an outline of the damage; receiving, by the image analysis and device control system, from the mobile device, and responsive to transmitting the instruction to display the at least one image and to display the prompt, a marked version of the at least one image, wherein the marked version comprises the at least one image with an outline drawn around the damage; determining, by the image analysis and device control system, an amount of pixels comprising dimensions of the damage; and determining, by the image analysis and device control system and based on the amount of pixels and the ratio output, the damage size output.

The arrangements described may also include other additional elements, steps, computer-executable instructions, or computer-readable data structures. In this regard, other embodiments are disclosed and claimed herein as well. The details of these and other embodiments of the present disclosure are set forth in the accompanying drawings and the description below. Other features and advantages of the disclosure will be apparent from the description, drawings, and claims.

BRIEF DESCRIPTION OF THE DRAWINGS

The present disclosure is illustrated by way of example and is not limited by the accompanying figures in which like reference numerals indicate similar elements and in which.

DETAILED DESCRIPTION

Figure 1:
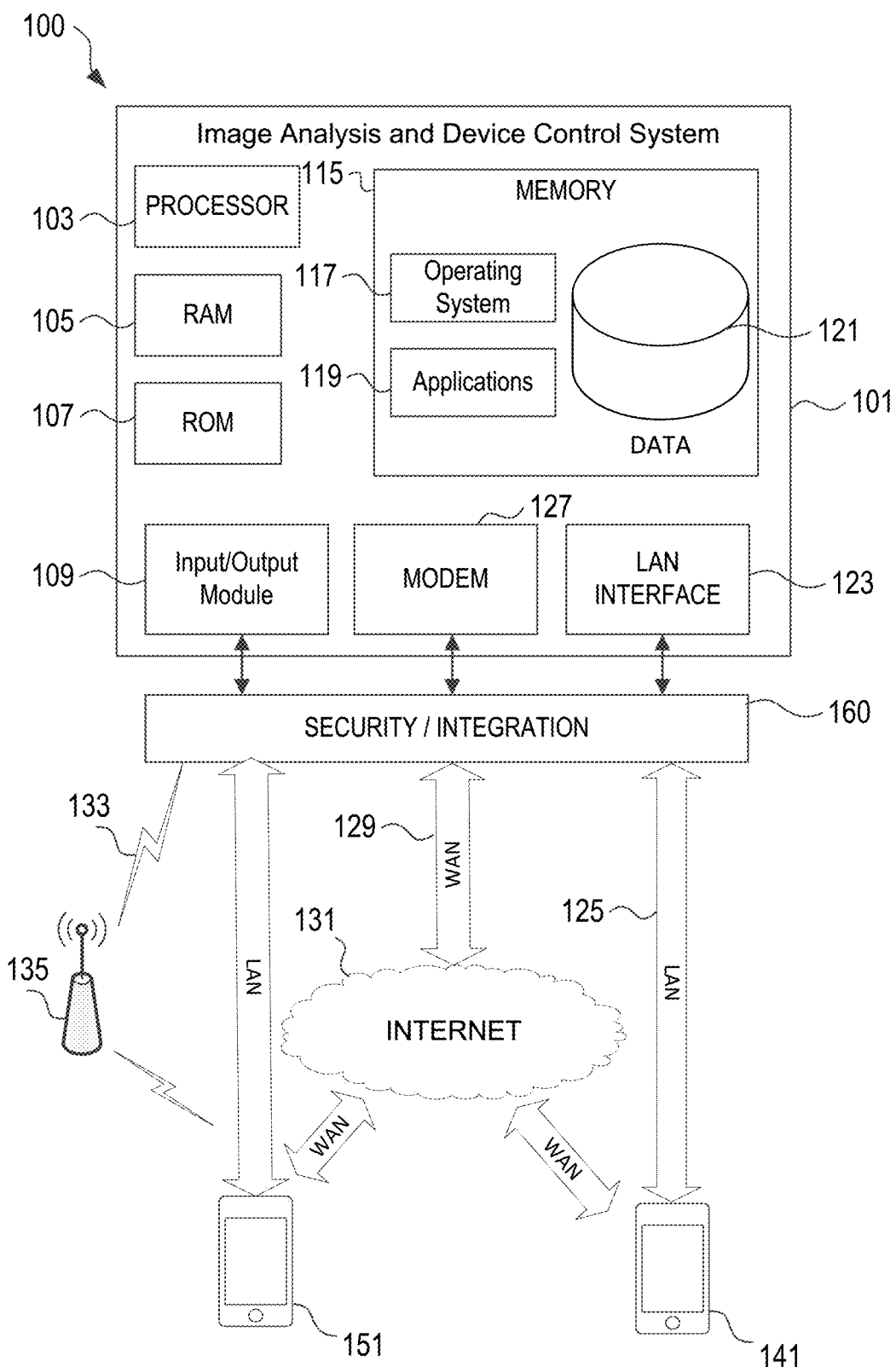
FIG. 1 shows a block diagram of one example image analysis and device control computing device (or system) in a computer system that may be used according to one or more illustrative embodiments of the disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing sensor data or events as described herein may be transferred between a source and a destination in the form of electromagnetic waves traveling through signal-conducting media such as metal wires, optical fibers, and/or wireless transmission media (e.g., air and/or space).

Aspects describes herein are related to determining a size of damaged property based on one or more reference objects and using machine learning. For instance, when property is damaged and must be evaluated in order to facilitate repair, images of the damaged property may be captured via a mobile device of a user. The image may include not only the damaged area but also additional objects generally found in various types of rooms, such as light switches having a standard size place or cover, electrical outlets having a standard size place or cover, and the like. Accordingly, these standard size objects may be evaluated and used to determine dimensions of damaged property.

For instance, as will be discussed more fully herein, arrangements described herein are directed to generating, by an image analysis and device control system and via machine learning analysis of an image comprising a surface, such as a surface of damaged property, and a standardized reference object, a surface dimension output. The image analysis and device control system may determine, using actual dimensions and pixel dimensions of the standardized reference object, an actual to pixel dimension ratio. Then, using the actual to pixel dimension ratio, the image analysis and device control system may determine, using pixel dimensions of the surface and the actual to pixel dimension ratio, actual dimensions of the surface. Using the actual dimensions of the surface, the image analysis and device control system may generate a surface dimension output and may transmit the surface dimension output to a mobile device along with an instruction to cause display of the surface dimension output. The image analysis and device control system may also determine, using the standardized reference object and via machine learning algorithms and datasets, a size and a type of damage on the surface. Based on the size and type of the damage, the image analysis and device control system may determine a settlement output comprising an indication of a settlement amount based on an estimated repair cost and a repair output comprising an indication of repair companies and their corresponding availability to repair the damage. The image analysis and device control system may transmit the settlement output and the repair output to the mobile device along with an instruction to cause display of the settlement output and the repair output.

The standardized reference object may be determined using machine learning algorithms and machine learning datasets. Machine learning datasets may be generated based on images comprising various surfaces, standardized reference objects, and instances of damage. The machine learning datasets may also be used to determine a type of damage and a room in which the surface is located. An image may be compared to the machine learning datasets to generate a standardized reference object output, which may be used to determine a surface dimension output, a settlement output, and a repair output.

These and various other arrangements will be described more fully herein.

FIG. 1 shows a block diagram of one example image analysis and device control system in a computer system 100 that may be used according to one or more illustrative embodiments of the disclosure. The image analysis and device control system 101 may have a processor 103 for controlling overall operation of the image analysis and device control system 101 and its associated components, including Random Access Memory (RAM) 105, Read Only Memory (ROM) 107, input/output module 109, and memory 115. The image analysis and device control system 101, along with one or more additional devices (e.g., terminals 141 and 151, security and integration hardware 160) may correspond to any of multiple systems or devices described herein, such as personal mobile devices, insurance systems servers, internal data sources, external data sources and other various devices. These various computing systems may be configured individually or in combination, as described herein, for receiving signals and/or transmissions from one or more computing devices.

Input/Output (I/O) 109 may include a microphone, keypad, touch screen, and/or stylus through which a user of the image analysis and device control system 101 may provide input, and may also include one or more of a speaker for providing audio output and a video display device for providing textual, audiovisual and/or graphical output. Software may be stored within memory 115 and/or storage to provide instructions to processor 103 for enabling the image analysis and device control system 101 to perform various actions. For example, memory 115 may store software used by the image analysis and device control system 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in an image analysis and device control system 101 (e.g., a personal mobile device, etc.), in order to receive and analyze the signals, transmissions, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the image analysis and device control system 101 to execute a series of computer-readable instructions, for example, receive an image, determine an amount of damage shown in the image, and offer settlement outputs and repair outputs to a user.

The computing device (e.g., a personal mobile device, insurance system server, etc.) may operate in a computer system 100 supporting connections to one or more remote computers, such as terminals 141 and 151. Such terminals may be personal computers or servers 141 (e.g., home computers, laptops, web servers, database servers), mobile communication devices 151 (e.g., mobile phones, tablet computers, etc.), and the like, each of which may include some or all of the elements described above with respect to the image analysis and device control system 101. The network connections depicted in FIG. 1 include a local area network (LAN) 125 and a wide area network (WAN) 129, and a wireless telecommunications network 133, but may also include other networks. When used in a LAN networking environment, the image analysis and device control system 101 may be connected to the LAN 125 through a network interface or adapter 123. When used in a WAN networking environment, the customized output generation computing device 101 may include a modem 127 or other means for establishing communications over the WAN 129, such as network 131 (e.g., the Internet). When used in a wireless telecommunications network 133, the image analysis and device control system 101 may include one or more transceivers, digital signal processors, and additional circuitry and software for communicating with wireless computing devices 151 and 141 (e.g., mobile phones, portable user computing devices, etc.) via one or more network devices 135 (e.g., base transceiver stations) in the wireless network 133.

Also illustrated in FIG. 1 is a security and integration layer 160, through which communications are sent and managed between the image analysis and device control system 101 (e.g., a personal mobile device, an intermediary server and/or external data source servers, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the image analysis and device control system 101. As an example, a security and integration layer 160 of the image analysis and device control system 101 may comprise a set of web application servers configured to use secure protocols and to insulate the image analysis and device control system 101 from external devices 141 and 151. In some cases, the security and integration layer 160 may correspond to a set of dedicated hardware and/or software operating at the same physical location and under the control of same entities as the image analysis and device control system 101. For example, layer 160 may correspond to one or more dedicated web servers and network hardware. In other examples, the security and integration layer 160 may correspond to separate hardware and software components which may be operated at a separate physical location and/or by a separate entity.

As discussed below, the data transferred to and from various devices in the computer system 100 may include secure and sensitive data, such as insurance policy data, and confidential user data. Therefore, it may be desirable to protect transmissions of such data by using secure network protocols and encryption, and also to protect the integrity of the data when stored on the various devices within a system, such as personal mobile devices, insurance servers, external data source servers, or other computing devices in the computer system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in a computer system 100. Data may be transmitted through the security and integration layer 160, using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In other examples, one or more web services may be implemented within the various devices in the computer system 100 and/or the security and integration layer 160. The web services may be accessed by authorized external devices and users to support input, extraction, and manipulation of the data between the various devices in the computer system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, data may be implemented in the security and integration layer 160 using the Secure Sockets Layer (SSL) or Transport Layer Security (TLS) protocol to provide secure connections between the image analysis and device control system 101 and various clients 141 and 151. SSL or TLS may use HTTP or HTTPS to provide authentication and confidentiality. In other examples, such web services may be implemented using the WS-Security standard, which provides for secure SOAP messages using Extensible Markup Language (XML) encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in computer system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data, such as sensor data, or other types of data from or write data to the CPU cache rather than reading/writing to memory 115, which may improve the speed of these operations. In some examples, a database cache may be created in which certain data from a database 121 is cached in a separate smaller database on an application server separate from the database server (e.g., at a personal mobile device or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations, such as faster response times and less dependence on network conditions when transmitting and receiving driver information, vehicle information, location information, and the like.

It will be appreciated that the network connections shown are illustrative and other means of establishing a communications link between the computers may be used. The existence of any of various network protocols such as Transmission Control Protocol (TCP)/Internet Protocol (IP), Ethernet, FTP, HTTP and the like, and of various wireless communication technologies such as Global System for Mobile Communication (GSM), Code Division Multiple Access (CDMA), WiFi, and WiMAX, is presumed, and the various computing devices described herein may be configured to communicate using any of these network protocols or technologies.

Additionally, one or more application programs 119 may be used by the various computing devices, including computer executable instructions for receiving and analyzing various signals or transmissions. In some examples, the one or more application programs 119 may be downloaded or otherwise provided to a device (e.g., from a central server or other device) and may execute on the device.

Figure 2:
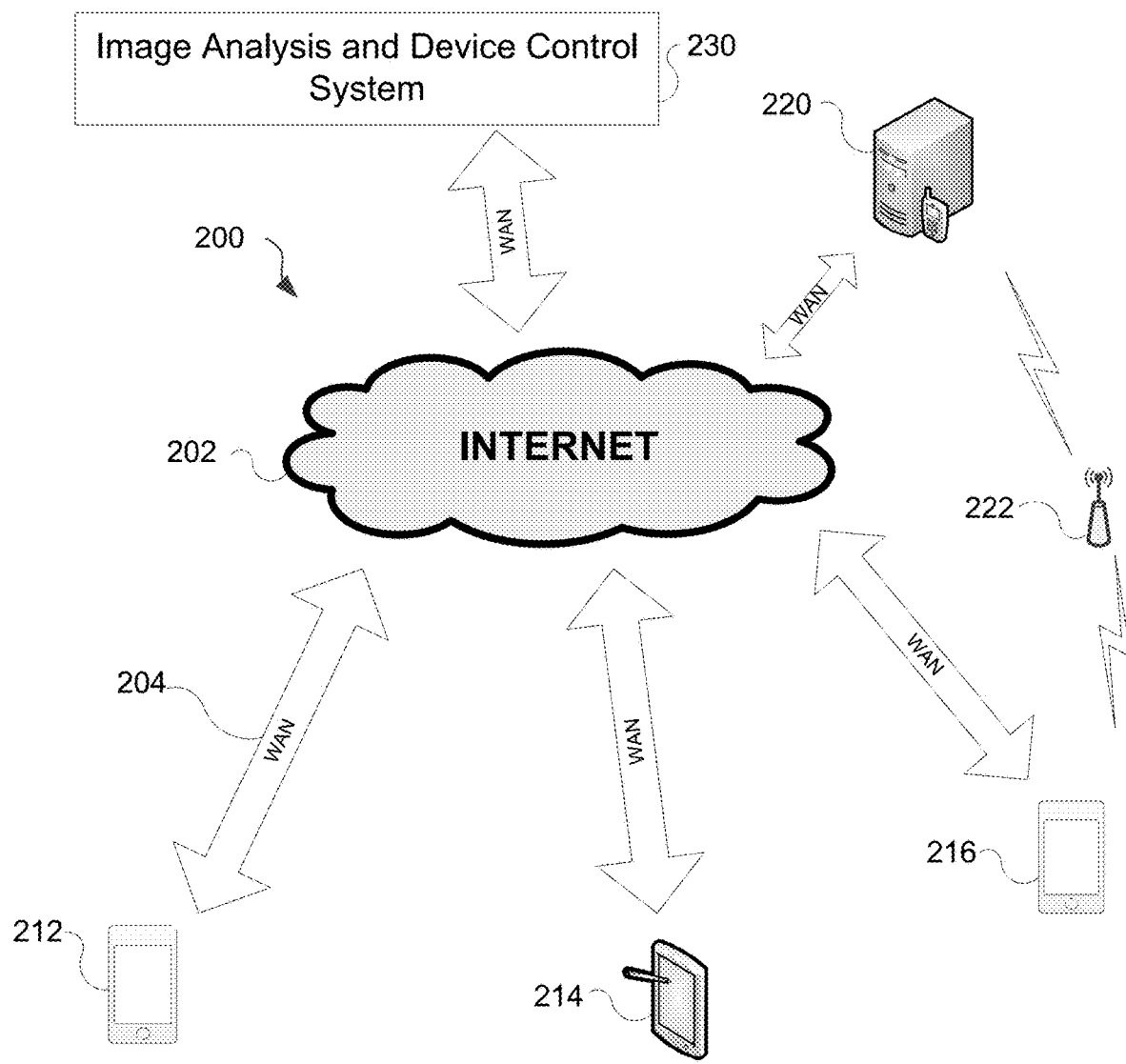
FIG. 2 shows a block diagram of a WAN networking environment, including a network (e.g., the Internet) or other means for establishing communications over the WAN network in accordance with one or more aspects described herein.

FIG. 2 shows a block diagram of a WAN networking environment 200, including a network 202 (e.g., the Internet) or other means for establishing communications over the WAN network 204 in accordance with one or more aspects described herein. The network 202 may be any type of network and may use one or more communication protocols (e.g., protocols for the Internet (IP), Bluetooth, cellular communications, satellite communications, and the like) to connect computing devices and servers within the networking environment 200 so they may send and receive communications between each other. In particular, the network 202 may include a cellular network and its components, such as cell towers. Accordingly, for example, a mobile device 212 (e.g., a smartphone) may communicate, via a cellular backhaul of the network 202, with another mobile device, e.g., tablet 214, smartphone 216.

The mobile devices 212, 214, 216 may communicate back and forth over the Internet, such as through a server 220. When used in a WAN networking environment 200, the server 220 may include one or more transceivers, digital signal processors, and additional circuitry and software for communicating with wireless mobile devices (e.g., smart phone 216) via one or more network devices 222 (e.g., base transceiver stations) in the wireless network.

The network 202 may include an image analysis and device control system 230. The image analysis and device control system 230 may comprise a part of the mobile devices 212, 214, 216, or the image analysis and device control system 230 may be separate from the mobile devices 212, 214, 216. For example, the image analysis and device control system 230 may comprise a part of an insurance system server, the server 220, and the like. The image analysis and device control system 230 may instruct a device, such as a mobile device 212, 214, 216 to collect images, may control one or more aspects of the image collection, and may then implement machine learning algorithms and machine learning datasets to analyze the collected images. For example, the image analysis and control system 230 may control operations of one of the mobile devices 212, 214, 216. Mobile devices 212, 214, 216 may be, for example, mobile phones, personal digital assistants (PDAs), tablet computers, smartwatches, and the like.

Figure 3:
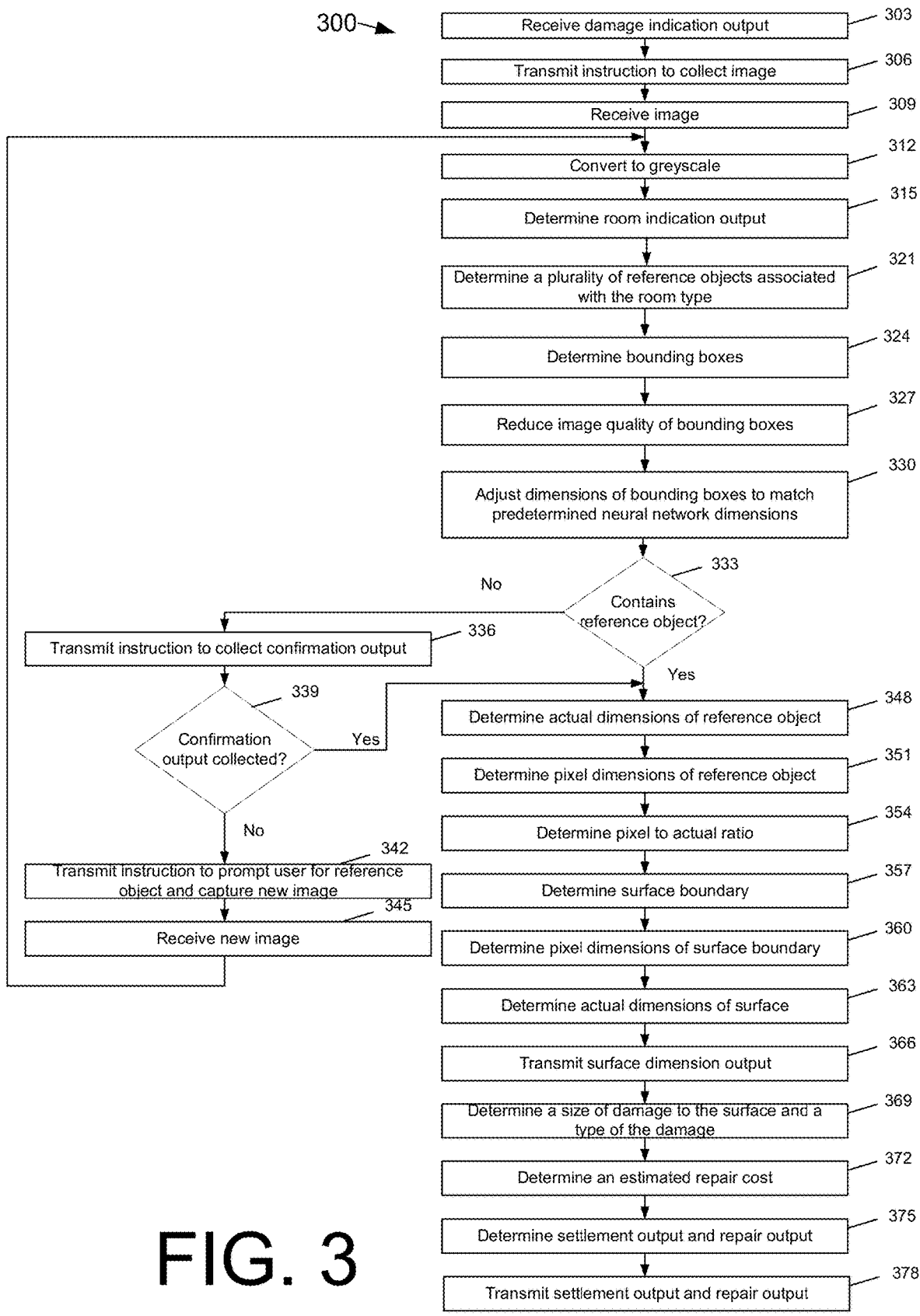
FIG. 3 is a flow diagram illustrating an example method for determining a surface dimension output in accordance with one or more aspects described herein.

FIG. 3 is a flow diagram illustrating an example method 300 for determining a surface dimension output in real time (or near real-time) and by an image analysis and device control system in accordance with one or more aspects described herein. The method 300 or one or more steps thereof may be performed by one or more computing devices or entities. For example, portions of the method 300 may be performed by components of the computer system 100, the WAN networking environment 200, or the image analysis and device control system 230. The method 300 or one or more steps thereof may be embodied in computer-executable instructions that are stored in a computer-readable medium, such as a non-transitory computer readable medium. The steps in this flow diagram need not all be performed in the order specified and some steps may be omitted or changed in order.

At step 303, a system, such as the image analysis and device control system 230, may receive a damage indication output from a mobile device. For example, a user may walk into his or her living room and see water damage on a wall. The user may activate or initiate an application executing on the mobile device and may report, via the application executing on the mobile device, this damage. The mobile device may then generate the damage indication output and may transmit the damage indication output to the image analysis and device control system 230. The damage indication output may indicate a type of damage such as water damage, fire damage, and the like. The damage indication may also indicate that the damage occurred on a particular surface such as a wall, a ceiling, a floor, and the like.

At step 306, the image analysis and device control system 230 may process the damage indication output, received at step 303, and may generate an instruction output instructing the mobile device to collect an image of the damage. The image analysis and device control system 230 may transmit, with the instruction output, a notification including instructions and recommendations for capturing the image (types of images to capture, and the like). This notification may comprise an email message, a text message, a multimedia message, and the like, and may contain a link to a damage assessment application. For example, the notification may comprise a link providing access to a login page in the damage assessment application or, if the mobile device does not have the damage assessment application installed, the notification may comprise a link to download the damage assessment application. The notification may also be a message requesting that a user navigate to the damage assessment application on the mobile device to capture the image of the damage. The image analysis and device control system 230 may transmit the instruction output responsive to receiving the damage indication output.

At step 309, the image analysis and device control system 230 may receive, from the mobile device and responsive to the instruction output transmitted at step 306, the requested image of the damage. The mobile device may transmit the image via the damage assessment application. For example, the image analysis and device control system 230 may receive, from the mobile device, an image of the water damage on the wall. The image may also contain a floor, other walls, and a ceiling that border the damaged wall. In some examples, the wall may contain a standardized reference object, such as a light switch, light switch plate, outlet, or an outlet plate. In other examples, the wall may not contain a standardized reference object.

At step 312, the image analysis and device control system 230 may begin to analyze the image received at step 309. As an initial step, the image analysis and device control system 230 may convert the image to greyscale. The image analysis and device control system 230 may be able to analyze the image with less processing power if the image is converted to greyscale than if the image remains in multiple colors. The image analysis and device control system 230 may convert the image to greyscale to assist with edge detection for standardized reference objects and surface boundaries. For example, the image analysis and device control system 230 may better distinguish between the damaged wall and other walls, as well as between the damaged wall and the standardized reference object if the image is in greyscale.

The image analysis and device control system 230 may convert the image to greyscale using, for example, colorimetric (perceptual luminance-reserving) conversion to greyscale. For example, to convert a color from an image comprising a typical gamma compressed (non-linear) red green blue (RGB) color model, the image analysis and device control system 230 may use gamma expansion to remove a gamma compression function. In doing so, the image analysis and device control system 230 may transform the image into a linear RGB color space. The image analysis and device control system 230 may then apply a weighted sum to red, green, and blue linear color components to determine a linear luminance. This allows the image analysis and device control system 230 to create a greyscale representation of the image, where the greyscale values for the greyscale representation have the same relative luminance as the color image.

At step 315, the image analysis and device control system 230 may determine a room indication output. The image analysis and device control system 230 may transmit an instruction to the mobile device to collect a room indication confirmation. For example, the instruction may comprise an instruction to generate a prompt, using the damage assessment application, for the user to input a room or type or room in which the damaged wall is located. For example, the room or type of room may be a living room, a kitchen, a basement, a bathroom, and the like. Based on the room indication confirmation, the image analysis and device control system may generate a room indication output comprising an indication of the type of room.

Alternatively, or additionally, the image analysis and device control system 230 may determine the room or room type using machine learning algorithms and datasets. For example, the image analysis and device control system 230 may compare the image to a plurality of stored images comprising different surfaces in different rooms. The plurality of stored images may each be associated with a corresponding room. Using the machine learning algorithms, the image analysis and device control system 230 may determine that a degree of similarity between the image and a subset of the plurality of stored images associated with a kitchen exceeds a predetermined threshold. For example, the image analysis and device control system 230 may determine that the image depicts several counters, a sink, and a refrigerator, and that generally this indicates that the room is a kitchen. If the degree of similarity exceeds a first predetermined threshold, the image analysis and device control system 230 may transmit, as part of the instruction, a request for confirmation that the image is of a particular room. For example, the image analysis and device control system 230 may determine, with 75% certainty, that the image contains a kitchen wall. In this example, the image analysis and device control system may instruct the mobile device to generate a confirmation prompt such as "is this wall in the kitchen?" If user input is received confirming the room type, the image analysis and device control system 230 may generate a room indication output indicating that the room is a kitchen.

If the degree of similarity exceeds a second predetermined threshold, the image and device control system 230 may determine that further confirmation of the room is unnecessary and may skip transmission of the instruction to collect the further confirmation. For example, the image analysis and device control system 230 may determine, with 90% certainty, that the image contains a kitchen wall. In this example, the image analysis and device control system 230 may not transmit the instruction to collect the further confirmation, and, instead may automatically generate a room indication output indicating that the room is a kitchen.

At step 321, the image analysis and device control system 230 may determine, based on the room indication output determined at step 315, a plurality of standardized reference objects associated with the room. For example, if the image analysis and device control system 230 determines that the room is a kitchen, the image analysis and device control system 230 may determine a plurality of standardized reference objects associated with a kitchen, such as, for example, a kitchen sink, a faucet, a stove, a dishwasher, hot and cold faucets, floor tiles, a table, a chair, a bar stool, a cabinet, and the like. If the image analysis and device control system 230 determines that the room is a front hallway, the plurality of standardized reference objects may be, for example, a key hole, a door handle, a door frame, a deadbolt, a door hinge, a stair, a railing, and the like. Other standardized reference objects may be, for example, a light switch, an outlet, an outlet plate, light bulbs, a can light, a phone outlet, a data jack, a baseboard, a nest, a smoke detector, a heat vent, a toilet, and the like. The image analysis and device control system 230 may also determine a known dimension associated with the standardized reference object that may be used to identify a size of another object, surface, and the like. For example a distance between hot and cold faucet handles, a distance between a door handle and a door frame or deadbolt, a stair height, a railing height, a table height, a chair height, a cabinet height and the like may be determined. The standardized reference objects may be stored in a database along with their standard sizes. For example, the database may indicate that a standard size for an outlet or outlet plate or cover is 2.75"×4.5." The database may be maintained at the image analysis and device control system 230 or at another location. The different pluralities of standardized reference objects may each be associated with a different neural network. For example, the kitchen may be associated with a first neural network and the living room may be associated with a second neural network.

The standard reference objects may be items within a home that have a standard size. For example, if a standard reference object is located in the image, the image analysis and device control system 230 may be able to determine exact actual dimensions of the standard reference object using the database.

At step 324, the image analysis and device control system 230 may determine a plurality of bounding boxes within the image received at step 309. For example, the image analysis and device control system 230 may determine, using edge detection, the plurality of bounding boxes. For example, the image analysis and device control system 230 may use shadow detection to determine abrupt differences in light intensity. A significant difference in intensity may indicate an edge, whereas a gradual difference may not indicate an edge. The image analysis and device control system 230 may determine the plurality of bounding boxes to enclose potential standardized reference objects or walls. Each bounding box may comprise a new image.

At step 327, the image analysis and device control system 230 may reduce image quality of each bounding box image determined at step 324. By reducing image quality, the image analysis and device control system 230 may perform edge detection with less processing power than if the bounding box images are left in their original resolutions. For example, the image analysis and device control system 230 may determine forty by one hundred and twenty (40×120) unit bounding boxes. At step 327, the image analysis and device control system 230 may reduce the bounding box images' dimensions to thirty two by four units.

At step 330, after shrinking the bounding box images at step 327, the image analysis and device control system 230 may adjust dimensions of the bounding box images to match predetermined neural network dimensions. For example, each image used for machine learning analysis and comparison by the neural network may comply with predetermined neural network dimensions. Thus, the image analysis and device control system 230 may adjust dimensions of the bounding box images to match the predetermined neural network dimensions to minimize processing power used in machine learning analysis. To adjust the dimensions of the bounding box images while still maintaining the new image quality determined at step 327, the image analysis and device control system may transpose each bounding box image, in its current size, onto a template comprising the predetermined neural network dimensions. The image analysis and device control system 230 may then fill in any empty or left over space within the template with black pixels. This may result in a modified image, for each bounding box, comprising the image quality determined at step 327 and the predetermined neural network dimensions described herein. For example, if the predetermined neural network dimensions are thirty two by thirty two (32×32) units, the transposition described at step 330 may allow the thirty two by four (32×4) unit bounding box image described at step 327 to undergo machine learning analysis at a size of thirty two by thirty two (32×32) units.

At step 333, the image analysis and device control system 230 may determine a standardized reference object output indicating whether the modified bounding box images determined at step 330 contain one or more of the plurality of standardized reference objects determined at step 321. For example, the image analysis and device control system 230 may have determined that an outlet or outlet plate or cover is an appropriate standardized reference object. In this example, the image analysis and device control system may analyze, using edge detection and machine learning algorithms and image sets, the modified bounding boxes to determine whether one or more of the modified bounding box images potentially contain an outlet or outlet plate or cover. The image analysis and device control system 230 may compare the modified bounding box images to stored images in the neural network previously determined to contain an outlet or outlet plate or cover. This may allow the image analysis and device control system 230 to determine whether the modified bounding box images contain an outlet or outlet plate or cover even if the outlet is, for example, at an angle in the modified bounding box images. The image analysis and device control system 230 may analyze the modified bounding box images for one or more standardized reference objects based on the plurality of reference objects associated with the room determined in step 321.

In some examples, the image analysis and device control system 230 may determine, based on the standardized reference object output, that one or more of the modified bounding box images do contain a standardized reference object. For example, the image analysis and device control system 230 may determine, via machine learning algorithms and with greater than a predetermined threshold level of certainty, that one or more of the modified bounding box images contain an outlet or outlet plate or cover. The image analysis and device control system 230 may transmit, to the mobile device, an acceptability output comprising an indication that one or more of the modified bounding box images do comprise the standardized reference object, and that the image is acceptable. In some examples the image analysis and device control system 230 may determine that the modified bounding box images do not contain the standardized reference object, or that the image analysis and device control system 230 is uncertain whether the modified bounding box images contain the standardized reference object. For example, the image analysis and device control system 230 may determine, via machine learning algorithms and image sets, that one or more of the modified bounding box images do not contain an outlet or outlet plate or cover, or that although a potential outlet is determined, it is determined with below the predetermined level of certainty. The predetermined level of certainty may be configured by a user, the image analysis and device control system 230, or another entity. The machine learning analysis described with regard to step 333 is further described below with regard to FIG. 4. If the image analysis and device control system 230 determines that one or more of the modified bounding box images do contain the standardized reference object, the image analysis and device control system 230 may proceed to step 348. If the image analysis and device control system 230 determines that one or more of the modified bounding box images do not contain the standardized reference object, the image analysis and device control system 230 may proceed to step 336.

At step 336, after determining that the modified bounding box images do not contain the standardized reference object at step 333, the image analysis and device control system 230 may transmit, to the mobile device, an instruction to generate a prompt for a confirmation output. For example, the image analysis and device control system 230 may transmit an instruction to determine whether the modified bounding box images contain the standardized reference object. For example, the image analysis and device control system 230 may transmit, to the mobile device, a request for user input identifying whether the standardized reference object is present. The confirmation output may comprise an indication that the standardized reference object is present.

At step 339, the image analysis and device control system 230 may determine whether a confirmation output, requested at step 336, was received. If the image analysis and device control system 230 determines that a confirmation output was received, and thus that the standardized reference object is present, the image analysis and device control system 230 may proceed to step 348 to determine actual dimensions of the standardized reference object. If the image analysis and device control system 230 determines that a confirmation output was not received, and thus that the standardized reference object is not present, the image analysis and device control system 230 may proceed to step 342.

At step 342, in response to determining at step 339 that no confirmation output was received, the image analysis and device control system 230 may transmit an instruction to the mobile device to generate a prompt for a user to place a new standardized reference object in front of the surface shown in the original image and to capture a new image of the surface. For example, the image analysis and device control system may transmit an instruction to the mobile device to prompt the user to place a dollar bill in the frame and to subsequently re-capture the image.

At step 345, in response to the instruction transmitted at step 342, the image analysis and device control system may receive the new image comprising the original image with a standardized reference object placed, by the user, into the frame. For example, the new image may be the image of the image of the water damage on the living room wall described above with regard to step 309, with the addition of a dollar bill fixed to the wall. After receiving the new image from the mobile device, the image analysis and device control system may return to step 312 to restart image processing and analysis.

Returning to step 333, if the image analysis and device control system 230 determines, based on the standardized reference object output, that one or more of the modified bounding box images does contain the standardized reference object, the image analysis and device control system 230 may proceed to step 348. For example, the image analysis and device control system 230 may determine that there is an outlet or outlet plate or cover on a wall in an image.

At step 348, after determining that a modified bounding box image does contain the standardized reference object at step 333, the image analysis and device control system 230 may determine an actual standardized reference object output comprising actual dimensions of the standardized reference object. The image analysis and device control system 230 may determine the actual dimensions by referencing a standardized reference object database. The standardized reference object database may be part of the image analysis and device control system 230 or the standardized reference object database may be separate from the image analysis and device control system 230. There may be a separate standardized reference object database for each neural network. For example, there may be a first standardized reference object database for a kitchen network and a second standardized reference object database for a living room network. In a different example, there may be a universal standardized reference object database that applies to multiple neural networks.

The standardized reference object database may comprise a list of standard reference objects and their corresponding dimensions. For example, the standardized reference object database may indicate that dimensions of a standard light switch are 2.75" by 4.5." The standardized reference object database may be determined via machine learning algorithms, user input, or both. For example, the image analysis and device control system 230 may analyze, using machine learning algorithms and datasets, various images. Based on determined dimensions of standardized reference objects in the images, the image analysis and device control system 230 may update dimensions in the standardized reference object database. A user may also input standard dimensions for various standardized reference objects. For example, a user may input standard dimensions via a mobile device, which may transmit the dimensions to the standardized reference object database. After determining the actual dimensions of the standardized reference object, the image analysis and device control system 230 may proceed to step 351 to determine pixel dimensions of the standardized reference object.

At step 351, the image analysis and device control system 230 may determine a standardized reference object pixel dimension output comprising an indication of the pixel dimensions of the standardized reference object. For example, the image analysis and device control system 230 may analyze the modified bounding box images to determine a pixel count for the height and width of the reference object. For example, the image analysis and device control system 230 may determine that a light switch on a wall in the image is 20×33 pixels.

At step 354, after determining the actual standardized reference object dimension output and the standardized reference object pixel dimension output at steps 348 and 351 respectively, the image analysis and device control system 230 may determine a ratio output comprising a pixel to actual dimension ratio. For example, the image analysis and device control system 230 may divide the pixel width of a standardized reference object by the actual width of the standardized reference object. For example, the image analysis and device control system 230 may determine a correlation between inches and pixels, such as 20/2.75 or roughly seven pixels per inch. The image analysis and device control system 230 may also determine an actual area and a pixel area of the standardized reference object, and may use these measurements to determine the ratio output. For example, the image analysis and device control system 230 may divide 660 square pixels by 12.5 square inches to determine a ratio output of 53:1. After determining the ratio output, the image analysis and device control system 230 may proceed to step 357 to determine a surface boundary.

At step 357, the image analysis and device control system 230 may determine a surface boundary output indicating a boundary of the surface. The image analysis and device control system 230 may determine the surface boundary output by analyzing the modified bounding box images determined at step 330. For example, the image analysis and device control system 230 may determine, via machine learning algorithms and analysis, the largest modified bounding box image that contains the standardized reference object. The largest modified bounding box image containing the standardized reference object may contain an entirety of the surface. For example, the largest modified bounding box image may contain an entire wall, ceiling, floor, and the like.

At step 360, once the surface boundary is determined, the image analysis and device control system 230 may determine a surface boundary pixel dimension output comprising pixel dimensions of the surface boundary. For example, the image analysis and device control system 230 may determine that dimensions of a living room wall containing a light switch are 200×1000 pixels. Actions performed by the image analysis and device control system 230 at step 360 may be similar to those described above with regard to step 351.

At step 363, after determining the surface pixel dimension output at step 360, the image analysis and device control system 230 may determine, using the surface pixel dimension output and the ratio output, an actual surface dimension output comprising an indication of actual dimensions of the surface. For example, the image analysis and device control system 230 may multiply the surface pixel dimension output, determined at step 360, by the ratio output, determined at step 354. This may allow the image analysis and device control 230 to determine the actual surface dimension output. For example, if the ratio output is 7:1, the image analysis and device control system 230 may divide the 200×1000 pixel dimensions of a living room wall by seven to determine the actual dimensions in inches. In this example, the image analysis and device control system 230 may determine that the actual surface dimension output of the living room wall is 28.5" by 143".

In another embodiment, the image analysis and device control system 230 may determine dimensions of an exterior surface based on analysis of an interior surface. As an example, a window may be shared by both an exterior surface and an interior surface. In addition or as an alternative to determining a boundary of the interior surface via a standardized reference on the interior surface, the image analysis and device control system 230 may utilize the methods and techniques described above with regard to step 357 to determine a boundary of the window. Once the window boundary is determined, the image analysis and device control system 230 may determine pixel dimensions associated with the window boundary. Based on the pixel to actual ratio, determined above at step 354, and the pixel dimensions associated with the window boundary, the image analysis and device control system 230 may determine actual dimensions of the window.

In some examples, once the actual dimensions of the window are determined, an analysis of the exterior surface may begin. For example, using the methods and techniques described above with regard to step 357, the image analysis and device control system may determine a surface boundary of the exterior wall. Once the surface boundary of the exterior wall is determined, the image analysis and device control system 230 may determine a pixel dimension of the exterior surface boundary and pixel dimensions of the window. Based on the previously determined actual dimensions of the window, the image analysis and device control system 230 may determine a pixel to actual ratio for the exterior wall. After determining the pixel to actual ratio for the window, the image analysis and device control system 230 may determine, based on the pixel to actual ratio for the exterior wall and the pixel dimensions of the exterior wall, actual dimensions for the exterior wall.

In yet another embodiment, the image analysis and device control system 230 may determine dimensions of a second surface (such as a second wall, a floor, a ceiling, or a roof that share a seam with a first surface). In this embodiment, the image analysis and device control system 230 may determine, at step 333, that the first surface contains a standardized reference object, and may use the standardized reference object to determine actual dimensions of a second surface. For example, the image analysis and device control system 230 may determine actual dimensions of the first surface. Then, using the actual dimensions of a seam connecting the first surface and the second surface, the image analysis and device control system 230 may determine actual dimensions of the second surface.

As an example, the image analysis and device control system 230 may determine, using the methods and techniques described above at step 357, a surface boundary of the second surface. At least a portion of the surface boundary may be shared between the first surface and the second surface. Then, the image analysis and device control system 230 may determine pixel dimensions of the second surface using techniques and methods similar to those described at step 360. Using the pixel dimensions of the shared boundary and the actual dimensions of the shared boundary, the image analysis and device control system 230 may determine a pixel to actual dimension ratio for the shared boundary. The image analysis and device control system 230 may then determine, using the pixel dimensions of the second surface and the pixel to actual dimension ratio for the shared boundary, the actual dimensions of the second surface.

Steps 351-363 may be performed by the image analysis and device control system 230 for multiple modified bounding box images. As a result, the image analysis and device control system 230 may determine multiple actual standardized reference object dimension outputs or actual surface dimension outputs. If the image analysis and device control system 230 does determine multiple actual standardized reference object dimension outputs or actual surface dimension outputs, the image analysis and device control system 230 may determine an average of the different outputs to determine a final actual standardized reference object dimension output or a final actual surface dimension output.

At step 366, after determining the actual surface dimension output, the image analysis and device control system 230 may transmit the actual surface dimension output to the mobile device. For example, the actual surface dimension output may be a message indicating the actual dimensions of the surface. The surface dimension output may be a text message, an e-mail, a notification within a mobile application, and the like.

In some embodiments, the image analysis and device control system 230 may also transmit, along with the actual surface dimension output, a surface material output. For example, the image analysis and device control system 230 may determine, via machine learning algorithms and datasets, a surface material output indicating a type of material comprising the surface. For example, the image analysis and device control system 230 may receive a plurality of images containing various surfaces made of different materials. The image analysis and device control system 230 may generate, using the plurality of images, machine learning datasets comprising sets of images containing a plurality of surfaces made up of a particular material. Then, when the image analysis and device control system 230 receives an image containing a surface for analysis, the image analysis and device control system 230 may compare, via machine learning analysis and algorithms, the image to the machine learning datasets. If the image matches one of the machine learning datasets to a degree that exceeds a predetermined correlation threshold, the image analysis and device control system 230 may determine that the image contains a surface comprising a material associated with that particular machine learning dataset. The surface material output may be used to subsequently determine an estimated repair cost at step 372.

At step 369, the image analysis and device control system 230 may determine a damage size output comprising an indication of a size of damage to the surface and a damage type output comprising an indication of a type of the damage. The image analysis and device control system 230 may use edge detection to determine boundaries of the damage. In addition or alternatively, the image analysis and device control system 230 may instruct the mobile device to prompt a user to trace an outline of the damage on an image of the surface. For example, the user may be able to trace the outline of water damage on a living room wall via a damage processing application on the mobile device. Once a damage boundary is determined, the image analysis and device control system may determine pixels dimensions of the damage, and then compute the actual dimensions of the damages using the ratio output determined at step 354 and the pixel dimensions of the damage.

In addition to determining the size of the damage to the surface, the image analysis and device control system 230 may determine, via machine learning algorithms and datasets, the type of the damage, such as water damage, fire damage, and the like. For example, the image analysis and device control system 230 may compare the damage to damage in a plurality of stored images. The stored images may be correlated with a type of damage, and based on the machine learning analysis, the device control system 230 may determine the type of damage based on a determination that a predetermined damage type correlation threshold was exceeded between the damage and previously determined damage in one or more of the stored images.

At step 372, after determining the damage size output and the damage type output, the image analysis and device control system 230 may determine, via machine learning algorithms and analysis, an estimated repair cost. For example, the image analysis and device control system 230 may compare, via machine learning algorithms and analysis, the size of the damage and the type of the damage to stored instances of damage. The stored instances of damage may each be associated with a repair cost. The image analysis and device control system 230 may determine repair costs associated with stored instances of damage that exceed a predetermined threshold correlation with the damage. The image analysis and device control system 230 may determine an average repair cost associated with the stored instances of damage that exceed the predetermined threshold correlation.

At step 375, after determining the estimated repair cost, the image analysis and device control system 230 may determine, using the estimated repair cost, a settlement output and a repair output. The settlement output may comprise a settlement price for the user based on the damage and the estimated repair cost. The repair output may comprise potential repairmen who may be able to repair the damage. The repair output may also comprise availability for the repairmen, and may have an option to schedule the repair.

At step 378, after determining the settlement output and the repair output, the image analysis and device control system 230 may transmit, to the mobile device, the settlement output and repair output, and may instruct the mobile device to generate, in the damage processing application, a display comprising the settlement output and the repair output.

Although steps 303-378 are shown in one example order in FIG. 3, steps 303-378 need not all be performed in the order specified and some steps may be omitted or changed in order. The method 300 may be a recursive method that continuously repeats. For example, images may continuously be collected and surface dimension outputs, settlement outputs, and repair outputs may continually be determined based on the images. The method 300 may be repeated in full or in part.

Figure 4:
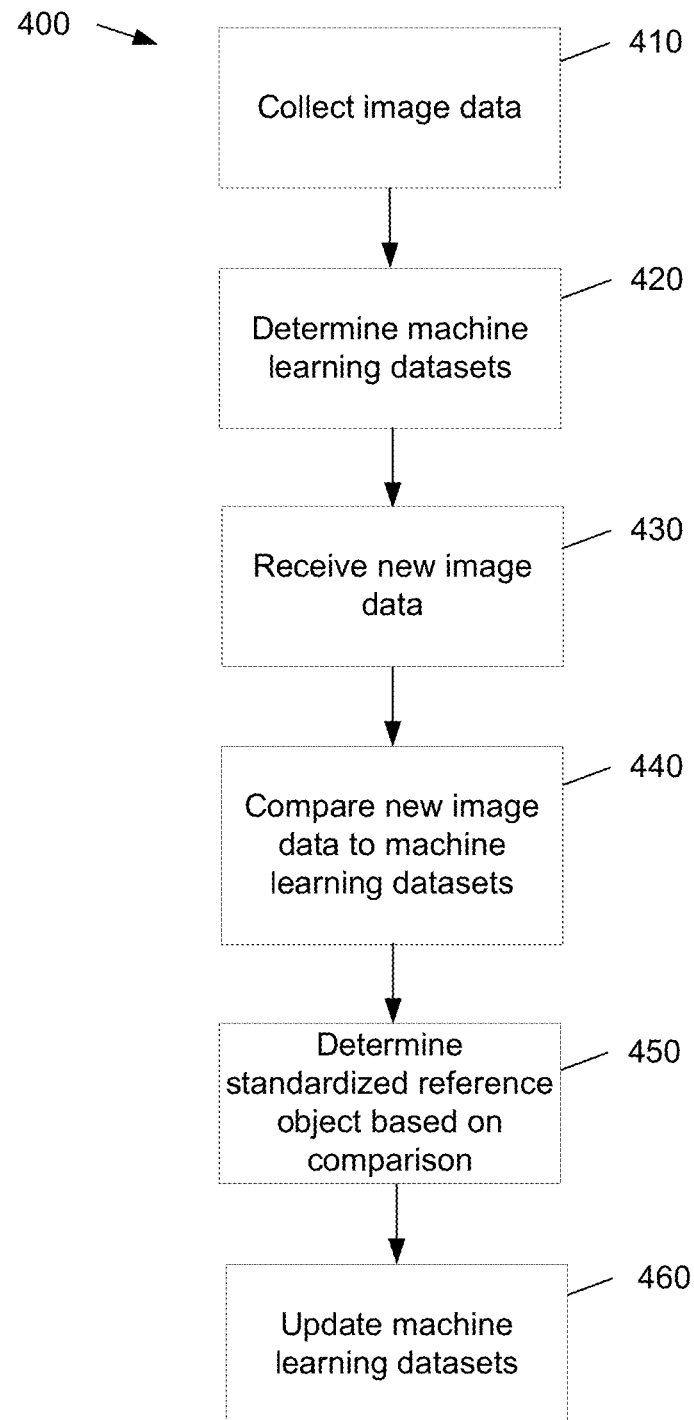
FIG. 4 shows a flow diagram illustrating a method for determining a standardized reference object output based on machine learning datasets in accordance with one or more aspects described herein.

FIG. 4 shows a flow diagram for a method 400 for determining a standardized reference object output based on machine learning datasets in accordance with one or more aspects described herein. For example, the method 400 may be used to determine whether an image contains a standardized reference object as described above with regard to step 333. The method 400 or one or more steps thereof may be performed by one or more computing devices or entities. For example, portions of the method 400 may be performed by components of the computer system 100, the WAN networking environment 200, or the image analysis and device control system 230. The method 400 or one or more steps thereof may be embodied in computer-executable instructions that are stored in a computer-readable medium, such as a non-transitory computer readable medium. The steps in this flow diagram need not all be performed in the order specified and some steps may be omitted or changed in order. The method 400 may be performed by the image analysis and device control system 230 which may, in some examples, include a machine learning engine configured to generate one or more machine learning datasets. The image analysis and device control system 230 may implement the method 400 in lieu of or in addition to the method described above with regard to step 333. Although the method 400 is described as being performed by the image analysis and device control system 230, the server 220, components of the computer system 100, or WAN networking environment 200 may also perform one or more aspects of the process described.

At step 410, the image analysis and device control system 230 may collect images of a plurality of surfaces and from a plurality of mobile devices. The images received at step 410 may comprise images of floors, walls, ceilings, and the like. The images may comprise standardized reference objects, as described above with regard to step 321. For example, the images may comprise outlets, light switches, and the like. As images are collected, the machine learning algorithms are trained to identify the standardized reference objects. Along with the collection of data, the image analysis and device control system 230 may also receive user inputs associated with the images. For example, the image analysis and device control system 230 may receive inputs verifying whether or not an image contains a particular standardized reference object. For example, the image analysis and device control system 230 may receive, from a mobile device, an input confirming that an image contains a light switch.

At step 420, the image analysis and device control system 230 (e.g., a machine learning engine of server 220) may determine or generate, based on the image data, one or more machine learning datasets. The machine learning engine may generate machine learning datasets that may link a plurality of images to a plurality of standardized reference objects. For example, one machine learning dataset may comprise images of outlets and another machine learning dataset may comprise images of light switches.

At step 430, the image analysis and device control system 230 may receive, from a mobile device, an image of damaged property that may or may not comprise a particular standardized reference object. The image of damaged property may be similar to the images described above at step 410.

At step 440, the image analysis and device control system 230 may compare the image of damaged property to the machine learning datasets. For example, the image analysis and device control system 230 may implement machine learning algorithms to determine whether the image of damaged property matches one or more machine learning datasets to a degree that exceeds a predetermined correlation threshold. For example, the image analysis and device control system 230 may implement at least one of: decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule based machine learning, regression, and the like.

The image analysis and device control system 230 may use the one or more machine learning datasets to inform the determination of whether the image of damaged property contains a standardized reference object. The image analysis and device control system 230 may compare a first portion of the image to a first machine learning dataset and may compare a second portion of the image to a second machine learning dataset. For example, the image of damaged property may contain more than one standardized reference object. The image analysis and device control system 230 may compare the entirety of the image of damaged property to a single machine learning dataset or multiple common machine learning datasets.

At step 450, the image analysis and device control system 230 may determine, based on the comparison described above with regard to step 430, whether the image of damaged property contains a standardized reference object. For example, the server 220 may quantify the determination of how the image of damaged property compares to the machine learning datasets. For example, if a correlation between the image of damaged property and one of the machine learning datasets exceeds the predetermined correlation threshold, then the image of damaged property may be correlated to a standardized reference object associated with the one of the machine learning datasets. The standardized reference object may comprise the standardized reference object described above with regard to step 333. Based on the standardized reference object, the server 220 may determine and transmit, to a mobile device, an actual surface dimension output, a settlement output, and a repair output. For example, these may be the actual surface dimension output, the settlement output, and the repair output described at steps 366 and 375.

At step 460, the image analysis and device control system 230 may update or validate, based on the image of damaged property, the machine learning datasets.

Although steps 410-460 are shown in one example order in FIG. 4, steps 410-460 need not all be performed in the order specified and some steps may be omitted or changed in order. The method 400 may be a recursive method that continuously repeats. For example, images may continuously be collected and standardized reference objects may continually be determined based on the images. The method 400 may be repeated in full or in part. Although the method 400 describes a method for determining, using machine learning algorithms and datasets, a standardized reference object, the method 400 may also be performed to determine a room indication output as described above with regard to step 315, a type of damage as described above with regard to step 369, and/or an estimated repair cost as described above with regard to step 372.

Figure 5:
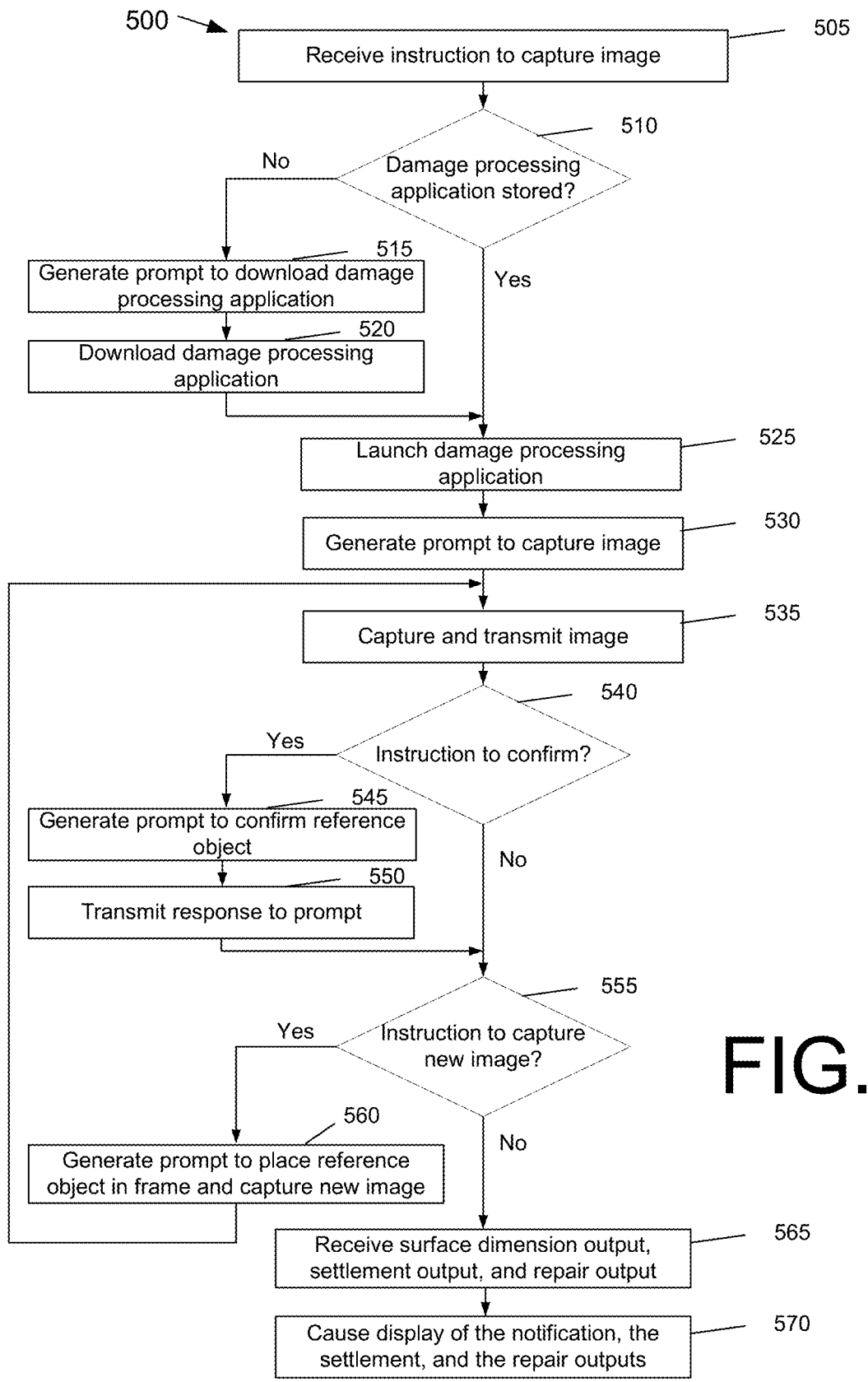
FIG. 5 is a flow diagram illustrating an example method for determining a surface dimension output by a mobile device in accordance with one or more aspects described herein.

FIG. 5 is a flow diagram illustrating an example method 500 for determining an actual surface dimension output by a mobile device in accordance with one or more aspects described herein. While FIG. 3 shows the example method for determining the actual surface dimension output from the perspective of the image analysis and device control system 230, FIG. 5 shows the example method from the perspective of a mobile device. The method 500 or one or more steps thereof may be performed by one or more computing devices or entities. For example, portions of the method 500 may be performed by components of the computer system 100, the WAN networking environment 200, or a mobile device. The method 500 or one or more steps thereof may be embodied in computer-executable instructions that are stored in a computer-readable medium, such as a non-transitory computer readable medium. The steps in this flow diagram need not all be performed in the order specified and some steps may be omitted or changed in order.

At step 505, the mobile device may receive, from the image analysis and device control system 230, an instruction to capture an image. This may comprise the instruction described above with regard to step 306. The instruction may comprise, for example, an instruction to launch a damage processing application, comprising a camera feature, and to capture an image of a household surface. The damage processing application may comprise a mobile application that allows a user to make insurance claims, document household damage, and receive automated settlement offers.

At step 510, in response to receiving the instruction to capture an image at step 505, the mobile device may determine whether the damage processing application is stored on the mobile device. If the damage processing application is stored on the mobile device, the mobile device may proceed to step 525 to launch the damage processing application. If the mobile device determines that the damage processing application is not stored, the mobile device may proceed to step 515.

At step 515, after determining that the damage processing application is not installed on the mobile device, the mobile device may generate a prompt for a user of the mobile device to initiate a download of the damage processing application. For example, the mobile device may generate a prompt comprising a link to download the damage processing application. The mobile device may receive the link along with the instruction to capture the image.

At step 520, after receiving a user input responsive to the prompt generated at step 515, the mobile device may download the damage processing application.

At step 525, once the damage processing application described with regard to steps 510-520 is installed, the mobile device may launch the damage processing application.

At step 530, after launching the damage processing application at step 525, the mobile device may generate, via the damage processing application, a prompt to capture an image of a surface. For example, the surface may comprise damage reported by a user of the mobile device to the image analysis and device control system 230.

At step 535, after receiving user input responsive to the prompt described at step 530, the mobile device may capture an image via the damage processing application. For example, the mobile device may capture an image of damage to a surface in a home. After capturing the image, the mobile device may transmit, to the image analysis and device control system 230, the image.

At step 540, the mobile device may determine whether an instruction to confirm a standardized reference object was received from the image analysis and device control system 230. This may comprise the instruction to collect a confirmation output described above with regard to step 336. If an instruction to confirm was not received by the mobile device, the mobile device may proceed to step 555. If the mobile device did receive an instruction to confirm, the mobile device may proceed to step 545.

At step 545, in response to receiving, from the image analysis and device control system 230, an instruction to confirm a standardized reference object, the mobile device may generate, via the damage processing application, a prompt to confirm the standardized reference object. For example, the mobile device may generate a prompt within the damage processing application that reads "We believe this picture contains an outlet. Can you confirm?" Additionally or alternatively, the mobile device may prompt the user to trace an outline of the standardized reference object. For example, the mobile device may display the image and prompt a user to draw a box surrounding the standardized reference object.

At step 550, after receiving a user input responsive to the prompt generated at step 545, the mobile device may transmit, to the image analysis and device control system 230, an indication of the user input. For example the indication may indicate whether the user confirmed the standardized reference object.

At step 555, the mobile device may receive, from the image analysis and device control system 230, an instruction to capture a new image of the surface. This may be the instruction described above with regard to step 342. If the mobile device does receive an instruction to recollect the image, the mobile device may proceed to step 560. If the mobile device does not receive an instruction to recollect the image, the mobile device may proceed to step 565.

At step 560, responsive to receiving an instruction from the image analysis and device control system 230 to capture a new image of the surface, the mobile device may generate a prompt requesting that the user place a reference object in the frame and capture the new image. For example, the prompt may request that the user place a dollar bill on a wall, and re-capture the image of the wall. Doing so will provide the image analysis and device control system 230 with a standardized reference object if the surface itself does not already comprise a standardized reference object such as an outlet or outlet plate or cover. After prompting the user to place a standardized reference object into the image, the mobile device may return to step 535 to re-capture and transmit the new image.

Returning to step 555, if the mobile device does not receive an instruction to capture a new image of the surface, the mobile device may proceed to step 565 to receive, from the image analysis and device control system 230, an actual surface dimension output, a settlement output, and a repair output. These may be the actual surface dimension output, settlement output, and repair output described above with regard to steps 366 and 375. For example, the actual surface dimension output may comprise an indication of dimensions of the surface in the image, the settlement output may comprise an automated settlement amount for damage that occurred to the surface, and the repair output may comprise an indication of potential repair companies and their respective availabilities.

At step 570, the mobile device may receive an instruction, from the image analysis and device control system 230, instructing the mobile device to cause display of the actual surface dimension output, the settlement output, and the repair outputs respectively. Responsive to the instruction, the mobile device may cause display, via the damage processing application, of the actual surface dimension output, the settlement output, and the repair outputs. The mobile device may generate a single item for display, or each output may have its own display. For example, the mobile device may cause display of the following: "the wall is 8' by 12'. The settlement amount for repair is $500. Repair Shop X is highly rated and is available tomorrow for the repair."

Although steps 505-570 are shown in one example order in FIG. 5, steps 505-570 need not all be performed in the order specified and some steps may be omitted or changed in order. The method 500 may be a recursive method that continuously repeats. For example, images may continuously be collected and surface dimension outputs, settlement outputs, and repair outputs may continually be determined based on the images. The method 500 may be repeated in full or in part.

Figure 6:
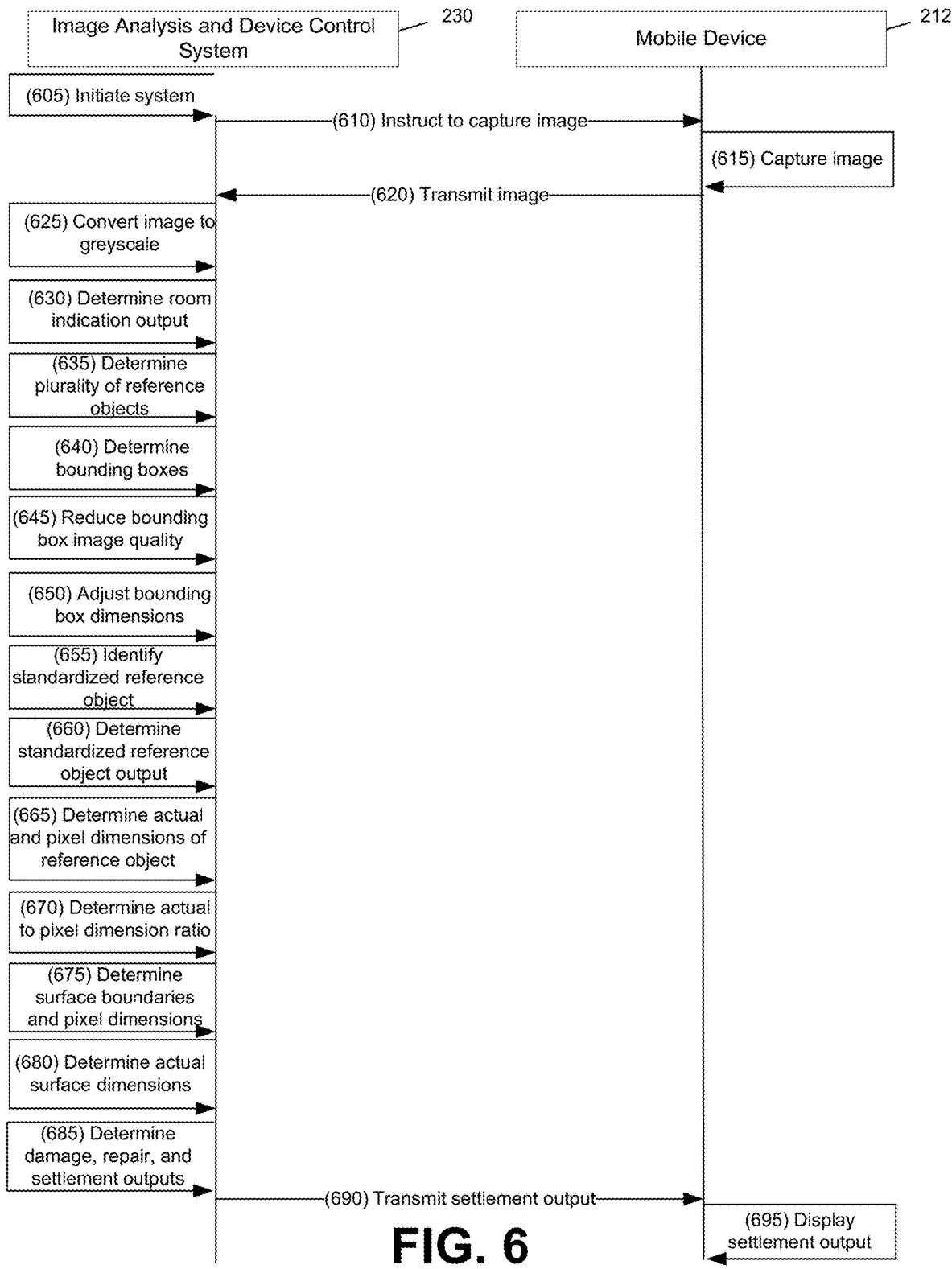
FIG. 6 shows an illustrative event sequence between an image analysis and device control system and a mobile device for determining a surface dimension output in accordance with one or more aspects described herein.

FIG. 6 shows an illustrative event sequence between an image analysis and device control system 230 and a mobile device 212 for determining an actual surface dimension output. While FIG. 3 shows the method described herein from the perspective of an image analysis and device control system and FIG. 5 shows the method described herein from the perspective of a mobile device, FIG. 6 shows the interplay and communication between the image analysis and device control system 230 and the mobile device 212. While the steps shown FIG. 6 are presented sequentially, the steps need not follow the sequence presented and may occur in any order. Additionally or alternatively, one or more steps or processes (e.g., as discussed herein with respect to other figures) may be added or omitted without departing from the invention.

At step 605, the image analysis and device control system 230 may initiate. For example, the image analysis and device control system 230 may establish connection with one or more mobile devices. The image analysis and device control system 230 may also activate and/or establish connection with one or more neural networks each comprising a plurality of stored images. The image analysis and device control system 230 may also active and/or establish connection with a standardized reference database comprising a plurality of correlations between standardized reference objects and their associated dimensions.

At step 610, the image analysis and device control system 230 may instruct the mobile device 212 to capture an image. For example, a user of the mobile device 212 may make a claim for water damage to a wall in his or her living room. The mobile device 212 may transmit an indication of the claim to the image analysis and device control system 230, which may transmit the instruction at step 610 requesting that the mobile device 212 prompt the user to capture an image of the damage to the living room wall. Actions performed at step 610 may be similar to those described above with regard to step 306.

At step 615, the mobile device 212 may generate, responsive to the instruction transmitted at step 610, a prompt for the user to capture an image. The mobile device 212 may generate the prompt via a damage processing application. For example, the mobile device 212 may store a damage processing application that a user may use to process claims for home damage. In response to receiving a user input requesting that the mobile device 212 capture an image via the damaging processing application, the mobile device may capture the image. For example, the mobile device 212 may display a prompt comprising "please take a picture of the damage" and may concurrently display a camera screen. In this example, the user may take a picture of the living room wall suffering water damage that he or she previously reported. Actions performed at step 615 may be similar to those described above with regard to steps 505-535.

At step 620, after capturing the image, the mobile device 212 may transmit, to the image analysis and device control system 230, the image. For example, the mobile device 212 may transmit the image of the living room wall suffering water damage captured at step 615 above. Actions performed at step 620 may be similar to those described above with regard to step 535.

At step 625, after receiving the image via the transmission at step 620, the image analysis and device control system 230 may begin to analyze the image and to determine a standardized reference object output. After receiving the image, the image analysis and device control system 230 may convert the image to greyscale. This may improve the image analysis and device control system's 230 ability to perform edge detection and to determine surface boundaries and standardized reference object boundaries. By eliminating color from the image, the image analysis and device control system 230 may discern between objects and boundaries while expending less processing power than if the image analysis and device control system 230 was distinguishing between various colors within the image.

At step 630, after converting the image to greyscale, the image analysis and device control system 230 may determine a type of room (e.g., living room, kitchen, bathroom, and the like) associated with the image. For example, the image analysis and device control system 230 may determine whether the image captures a surface in a living room, a kitchen, a bathroom, and the like. In some examples, the image analysis and device control system 230 may instruct the mobile device 212 to prompt the user for a room indication output that identifies the type of room associated with the image. For example, the image and device control system 230 may instruct the mobile device 212 to generate a prompt that comprises "please identify a type of room associated with the picture."

In another example, the image analysis and device control system 230 may determine, via machine learning algorithms and datasets, the type of room. For example, the image analysis and device control system 230 may perform object recognition on the image, and may determine via machine learning algorithms the room. As an example, if the image analysis and device control system 230 identifies a sink, a toilet, and a shower in the image, the image analysis and device control system 230 may determine that the image is associated with a bathroom and may not instruct the mobile device 212 to collect a room indication output. In yet another example, the image analysis and device control system 230 may perform object recognition on the image to identify the type of room, but may determine, via machine learning algorithms and analysis, the type of the room with a level of certainty that falls below a predetermined room identification threshold. For example, the image analysis and device control system 230 may identify a sink and an outlet plate. In this example, the image analysis and device control system 230 may instruct the mobile device 212 to prompt the user for confirmation that the image is associated with a certain type of room. For example, the image analysis and device control system 230 may instruct the mobile device 212 to generate a prompt that comprises "is this picture taken in your kitchen?" Actions performed at step 630 may be similar to those described above with regard to steps 315.

At step 635, once the room type is determined, the image analysis and device control system 230 may access a stored plurality of standardized reference objects, determined via machine learning algorithms and analysis and associated with the room associated with the image. For example, if the image analysis and device control system 230 determines that the room is a kitchen, the plurality of standardized reference objects may comprise, for example, a kitchen sink, a faucet, a stove, a dishwasher, hot and cold faucets, floor tiles, a table, a chair, a bar stool, a cabinet, and the like. The standard reference objects may be household objects that have standard dimensions. The image analysis and device control system 230 may also determine a known dimension associated with the standardized reference object that may be used to identify a size of another object, surface, and the like. Actions performed at step 635 may be similar to those described above with regard to step 321.

At step 640, after determining the plurality of reference objects, the image analysis and device control system 230 may determine a plurality of bounding boxes comprising the image. Each bounding box may comprise a subset of the pixels comprising the image, and may allow the image analysis and device control system to analyze the image, via machine learning algorithms and analysis, in multiple smaller pieces. This may help the image analysis and device control system 230 to distinguish between surface boundaries and standardized reference objects. For example, a first bounding box may outline the border of an outlet plate or cover in the image and a second bounding box may outline the wall to which the outlet plate or cover is affixed. Actions performed at step 640 may be similar to those described above with regard to step 324.

At step 645, after determining the plurality of bounding boxes, the image analysis and device control system 230 may reduce the image quality of each bounding box. For example, the image analysis and device control system 230 may reduce the image quality of the first bounding box and the second bounding box. By reducing image quality, the image analysis and device control system 230 may perform edge detection with less processing power than if the bounding box images are left in their original resolutions. For example, the image analysis and device control system 230 may determine forty by one hundred and twenty (40×120) unit bounding boxes. The image analysis and device control system 230 may reduce the bounding box images' dimensions to thirty two by four (32×4) units. Actions performed at step 645 may be similar to those described above with regard to step 327.

At step 650, after reducing the image quality of the bounding box images, the image analysis and device control system 230 may adjust the dimensions of each bounding box to be analyzed via a neural network. There may be predetermined neural network dimensions associated with the neural network, and thus the bounding box images may be adjusted to conform with the predetermined neural network dimensions. To make this adjustment, the image analysis and device control system 230 may transpose the bounding box image onto an all black image having the predetermined neural network dimensions. This may result in the bounding box image, with the rest of the space within the predetermined neural network dimensions filled in with black pixels. After adjusting the bounding box to conform with the predetermined neural network dimensions, the image analysis and device control system 230 may analyze, via the neural network and using machine learning algorithms and analysis, the bounding box. The neural network may comprise a plurality of images associated with one or more standardized reference objects. A separate neural network may be developed for different rooms in a home. For example, a first neural network may be used to analyze kitchen images, whereas a second neural network may be used to analyze hallway images. This may allow different neural networks to be particularly well trained in distinguishing particular standardized reference objects associated with that neural network's associated room. In another example, a single neural network may be used for multiple rooms. The neural network may comprise one or more machine learning datasets that the image analysis and device control system 230 may use for machine learning analysis of various images. Actions performed at step 650 may be similar to those described above with regard to step 330.

At step 655, using the neural network and machine learning algorithms, the image analysis and device control system 230 may analyze bounding boxes to identify a standardized reference object in the image. The image analysis and device control system 230 may use edge detection and variance in light intensity to distinguish between a surface and a standardized reference object. Actions performed at step 655 may be similar to those described above with regard to step 333.

At step 660, once the image analysis and device control system 230 identifies a potential standardized reference object via edge detection, the image analysis and device control system 230 may use machine learning algorithms and analysis to determine a standardized reference object output that identifies the standardized reference object. For example, by comparing a bounding box containing an outlet plate to a machine learning dataset comprising a plurality of outlet plates, the standardized reference object may determine that the bounding box comprises an outlet plate. If the image analysis and device control system 230 identifies a standardized reference object, the image analysis and device control system 230 may proceed to step 665. Actions performed at step 660 may be similar to those described above with regard to step 333.

At step 665, once the image analysis and device control system 230 has analyzed the image and determined the standardized reference object output, the image analysis and device control system 230 may determine an actual standardized reference object dimension output and a standardized reference object pixel dimension output, comprising indications of actual dimensions and pixel dimensions of the standardized reference object respectively. The image analysis and device control system 230 may consult a standardized reference object database to determine the actual standardized reference object dimension output. The standardized reference object database may be stored at the image analysis and device control system 230 or elsewhere. The standardized reference object database may comprise an index of standardized reference objects and their corresponding dimensions. For example, the standardized reference object database may comprise an entry "light switch-2.75" by 4.5."" The standardized reference object database may be generated and maintained via machine learning algorithms and analysis.

After determining the actual standardized reference object dimension output, the image analysis and device control system 230 may determine the standardized reference object pixel dimension output. For example, the image analysis and device control system 230 may analyze an image to determine the height and width of the standardized reference object in terms of pixels such as 20×33 pixels. Actions performed at step 665 may be similar to those described above with regard to steps 348-351.

At step 670, the image analysis and device control system 230 may use the actual standardized reference object dimension output and the standardized reference object pixel dimensions to determine a ratio output comprising an actual to pixel dimension ratio. The ratio output may comprise a correlation between an actual measurement unit and pixels for the image. For example, the image analysis and device control system 230 may determine a ratio output for the light switch described at step 665 may comprise 2.75:20 or roughly 1:7. Actions performed at step 670 may be similar to those described above with regard to step 354.

At step 675, the image analysis and device control system 230 may determine a surface boundary output comprising an indication of boundaries of the surface to be analyzed and a surface pixel dimension output. To determine the surface boundary output, the image analysis and device control system 230 may determine the largest bounding box, of the bounding boxes determined at step 640, that contains the standardized reference object. For example, the image analysis and device control system 230 may have determined, at step 640, a bounding box that comprises an entire wall. If this bounding box also contains the standardized reference object, such as the light switch described above, the image analysis and device control system 230 may determine that this wall is the target surface. The image analysis and device control system 230 may then determine, using the boundary output, the surface pixel dimension output that comprises the pixel dimensions of the wall, such as 200×1000 pixels. Actions performed at step 675 may be similar to those described above with regard to steps 357 and 360.

At step 680, the image analysis and device control system 230 may determine an actual surface dimension output comprising an indication of actual dimensions of the surface determined at 675. Using the ratio output determined above at step 670 and the surface pixel dimension output determined at step 675, the image analysis and device control system 230 may determine the actual surface dimension output. For example, the image analysis and device control system 230 may multiply the surface pixel dimension output by the ratio output. As an example, the image analysis and device control system 230 may multiply 200 pixels*1 inch/7 pixels=28.5" and 1000 pixels*1 inch/7 pixels=143" to determine the width and height of the wall respectively. Actions performed at step 680 may be similar to those described above with regard to step 363.

At step 685, the image analysis and device control system 230 may determine a damage output and a settlement output. While the surface dimension output described above at step 680 may comprise an indication of actual dimensions of the surface, the damage output may comprise an indication of a size and type of damage to the surface. For example, the damage may affect a portion of an entire wall. Using a similar method as described above with regard to determining actual dimensions of the surface at step 680, the image analysis and device control system 230 may determine a size of damage to the surface. For example, the image analysis and device control system 230 may determine, using machine learning analysis and edge detection, an outline of the damage. Additionally or alternatively, the image analysis and device control system 230 may instruct the mobile device 212 to prompt the user to trace the outline of the damage via a display on the mobile device 212. After determining the outline of the damage, the image analysis and device control system 230 may determine pixel dimensions of the damage, and then may use the actual to pixel dimension ratio determined at step 670 to determine the actual dimensions of the damage. For example, the image analysis and device control system 230 may determine five square feet of water damage on a wall.

In addition to determining the size of the damage, the image analysis and device control system 230 may determine a type of the damage. For example, the image analysis and device control system may analyze, via machine learning algorithms and datasets, the image to determine the type of damage. The damage may comprise water damage, fire damage, and the like.

Via machine learning algorithms and datasets and based on the determined size and type of the damage, the image analysis and device control system 230 may determine an estimated repair cost. For example, the image analysis and device control system 230 may determine an estimate to repair three square feet of water damage on a wall. To determine the estimate, the image analysis and device control system 230 may determine an average cost of a plurality of similar repairs. The image analysis and device control system 230 may also determine several repair companies who may be able to perform the repair and availability of each company. The image analysis and device control system 230 may generate a settlement output comprising an indication of a settlement amount and a repair output comprising information about the repair companies. Actions performed at step 685 may be similar to those described above with regard to steps 369 and 375.

At step 690, the image analysis and device control system 230 may transmit, to the mobile device 212, the damage output, settlement output and/or the repair output. The settlement output, damage output, and/or repair output may be transmitted to the mobile device 212 together or separately. The image analysis and device control system 230 may also transmit an instruction for the mobile device 212 to cause display of the settlement output, the damage output, and/or the repair output. Actions performed at step 690 may be similar to those described above with regard to step 378.

At step 695, the mobile device 212 may display the settlement output, the damage output, and the repair output responsive to the instruction sent at step 690. For example, the mobile device may cause display, via the damage processing application, of an indication such as "settlement amount for water damage to living room wall=$500; Repair Shop Y is available to fix the damage tomorrow and Friday." Actions performed at step 695 may be similar to those described above with regard to steps 565 and 570.

Although steps 605-695 are shown in one example order in FIG. 6, steps 605-695 need not all be performed in the order specified and some steps may be omitted or changed in order. The event sequence shown in FIG. 6 may be a recursive sequence that continuously repeats. For example, images may continuously be collected and surface dimension outputs, settlement outputs, and repair outputs may continually be determined based on the images. The event sequence may be repeated in full or in part.

Figure 7:
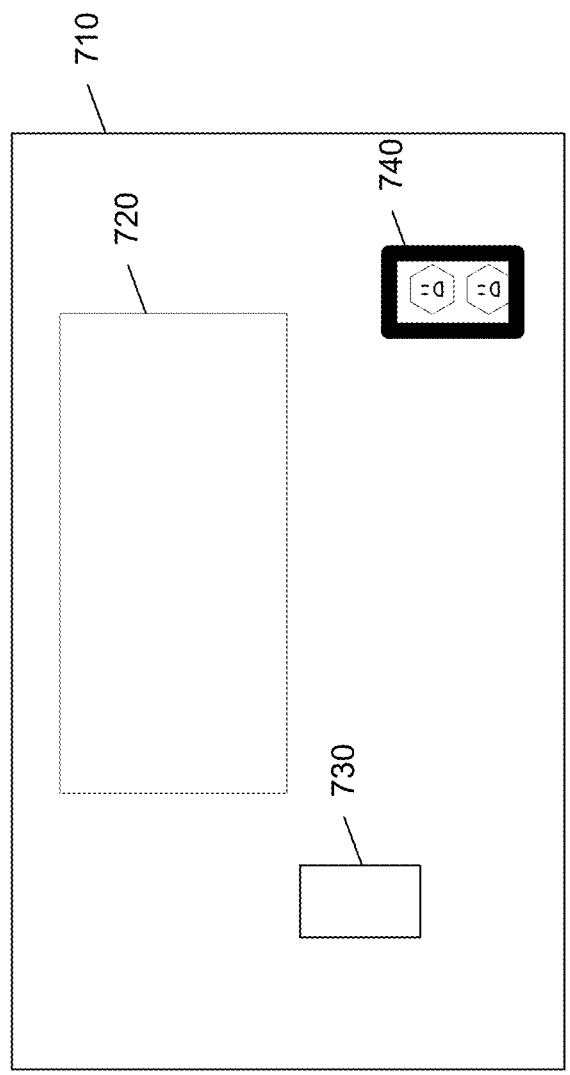
FIG. 7 shows an example surface having dimensions that may be determined by an image analysis and device control system in accordance with one or more aspects described herein.

FIG. 7 shows an example surface whose dimensions may be determined by the image analysis and device control system 230 via the methods described herein. For example, an image may comprise a living room wall 710. The living room wall 710 may comprise a painting 720, an empty hole 730, and an outlet plate 740. Due to the standard size of the outlet plate 740, the image analysis and device control system 230 may already know the actual dimensions of the outlet plate 740, which may, in some examples, be 3.13"× 4.88". The image analysis and device control system 230 may determine pixel dimensions of the outlet plate 740, which may be 31 pixels by 47 pixels. By correlating the pixel dimensions and the actual dimensions of the outlet plate 740, the image analysis and device control system may determine an actual to pixel dimension ratio using the outlet plate 740. In this example, the actual to pixel dimension ratio may comprise 0.10096 and 0.10382 for the x and y axis respectfully. The image analysis and device control system may determine the pixel dimensions of the living room wall 710, which may be 592 pixels by 346. The image analysis and device control system may then multiply the pixel dimensions of the living room wall 710 by the actual to pixel dimension ratio to determine actual dimensions of the living room wall 710, which in this example, may be 59.77" by 35.93".

Figure 8:
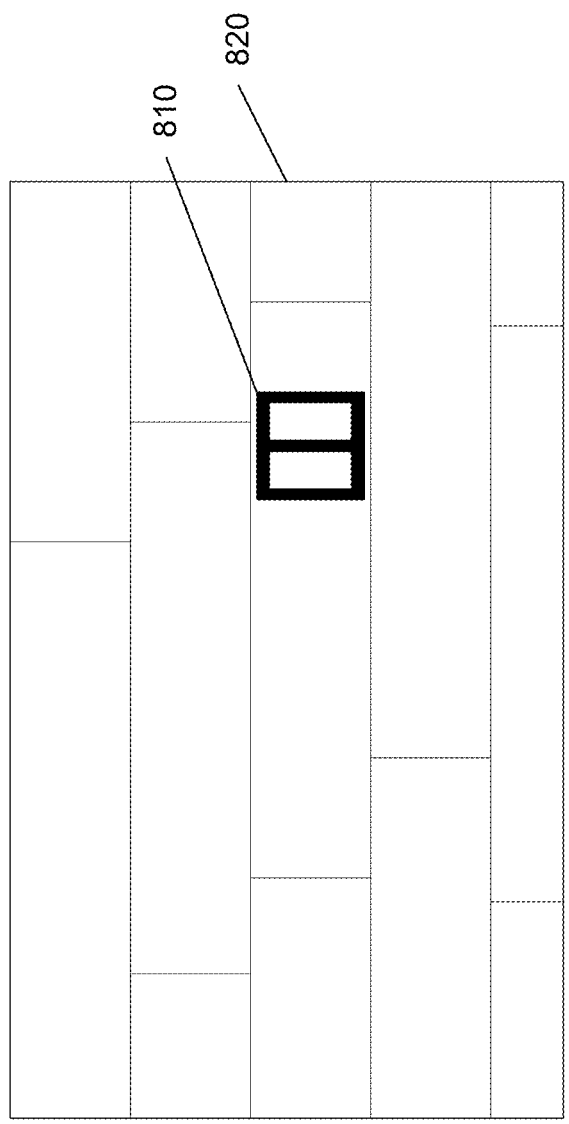
FIG. 8 shows a determination of an example standardized reference object by an image analysis and device control system.

FIG. 8 shows a determination of an example standardized reference object by the image analysis and device control system 230. Using edge detection, the image analysis and device control system 230 may determine a plurality of bounding boxes comprising an image, as described above with regard to step 324. The image analysis and device control system 230 may determine the boxes based on sharp discrepancies in light intensity. Thus, if the image analysis and device control system 230 analyzes an image of a wooden wall 820, the image analysis and device control system 230 may determine a bounding box for each plank. The image analysis and device control system 230 may also determine a bounding box for a light switch 810. By analyzing these bounding boxes via machine learning algorithms and datasets, the image analysis and device control system may distinguish between the bounding boxes that do not contain the light switch 810 and the bounding box that does contain the light switch 810. Furthermore, the image analysis and device control system 230 may use the machine learning algorithms to determine that the light switch 810 comprises a standardized reference object, and may subsequently determine the dimensions of the wooden wall 820 based on the dimensions of the light switch 810.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing sensor or other data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. A method comprising:
    transmitting, by an image analysis and device control system including a processor and to a mobile device, an instruction to capture at least one image;
    receiving, by the image analysis and device control system, the at least one image;
    determining, by the image analysis and device control system and using one or more machine learning algorithms, a standardized reference object output comprising an indication that the at least one image comprises a standardized reference object, wherein the determining the standardized reference object output comprises:
        determining, using the one or more machine learning algorithms, a plurality of bounding boxes comprising the at least one image, wherein determining the plurality of bounding boxes includes adjusting dimensions of the plurality of bounding boxes to match predetermined dimensions for a neural network, and
        inputting, into the neural network, the plurality of bounding boxes for analysis by the one or more machine learning algorithms to determine whether the at least one image comprises the standardized reference object;
    determining, by the image analysis and device control system and based on an actual standardized reference object dimension output and a standardized reference object pixel dimension output, a ratio output comprising a correlation between the actual standardized reference object dimension output and the standardized reference object pixel dimension output;
    determining, by the image analysis and device control system and using edge detection, a surface boundary output comprising an indication of boundaries of a surface comprising the standardized reference object;
    determining, by the image analysis and device control system, a surface pixel dimension output comprising pixel dimensions for the surface;
    determining, by the image analysis and device control system and based on the ratio output and the surface pixel dimension output, an actual surface dimension output comprising actual dimensions for the surface; and
    transmitting, by the image analysis and device control system and to the mobile device, the actual surface dimension output.

2. The method of claim 1, further comprising receiving, by the image analysis and device control system and from the mobile device, a damage indication output, and wherein the transmitting the instruction to capture the at least one image is responsive to the receiving the damage indication output.

3. The method of claim 1, wherein the instruction to capture the at least one image comprises a link to download a damage processing application.

4. The method of claim 1, wherein the actual standardized reference object dimension output comprising an indication of actual dimensions for the standardized reference object and wherein the standardized reference object pixel dimension output comprising pixel dimensions for the standardized reference object.

5. The method of claim 1, wherein the standardized reference object comprises at least one of: a light switch, an outlet, an outlet plate, a light bulb, a can light, a phone outlet, a data jack, a base board, a nest, a smoke detector, a kitchen sink, a faucet, a stove, a dishwasher, a floor tile, hot and cold faucets, a heat vent, a key hole, a door handle, a door frame, a deadbolt, a door, a stair, a railing, a table, a chair, a bar stool, a toilet, and a cabinet.

6. The method of claim 1, further comprising:
    transmitting, by the image analysis and device control system and to the mobile device, an instruction to prompt for a room indication input comprising an indication of a type of room in which the at least one image was captured;
    receiving, by the image analysis and device control system and from the mobile device, the room indication input;
    determining, by the image analysis and device control system and based on the room indication input, a room indication output; and
    determining, by the image analysis and device control system and based on the room indication output, a plurality of standardized reference objects.

7. The method of claim 6, wherein the determining the standardized reference object output comprises determining that the at least one image comprises at least one of the plurality of standardized reference objects.

8. The method of claim 1, further comprising transmitting, by the image analysis and device control system and to the mobile device, an acceptability output comprising an indication that the at least one image comprises the standardized reference object and that the at least one image is acceptable.

9. The method of claim 1, further comprising:
    transmitting, by the image analysis and device control system and to the mobile device, an instruction to prompt a user for confirmation that the at least one image contains the standardized reference object; and
    receiving, by the image analysis and device control system and from the mobile device, a confirmation output comprising an indication of the confirmation.

10. The method of claim 9, wherein the determining, by the image analysis and device control system and using the one or more machine learning algorithms, that the at least one image comprises the standardized reference object comprises determining, based on the indication of the confirmation, that the at least one image comprises the standardized reference object.

11. The method of claim 1, further comprising:
    receiving, by the image analysis and device control system, a second image;
    determining, by the image analysis and device control system and using the one or more machine learning algorithms, that the second image does not comprise the standardized reference object;
    transmitting, by the image analysis and device control system, to the mobile device, and in response to determining that the second image does not comprise the standardized reference object, an instruction to prompt a user to place a reference object in front of the surface and to capture, using the mobile device, a new image of the surface;
    receiving, by the image analysis and device control system and from the mobile device, the new image; and
    analyzing, by the image analysis and device control system and using the reference object, the new image.

12. The method of claim 1, further comprising converting, by the image analysis and device control system and prior to analyzing the at least one image, the at least one image to greyscale.

13. The method of claim 1 wherein:
    the determining, by the image analysis and device control system and using the one or more machine learning algorithms, the standardized reference object output comprises: reducing, by the image analysis and device control system, image quality of the plurality of bounding boxes;
adjusting, by the image analysis and device control system, the dimensions of the plurality of bounding boxes to match the predetermined dimensions for the neural network comprises transposing the plurality of bounding boxes on top of a black image that comprises the predetermined dimensions.

14. The method of claim 1, wherein the at least one image comprises an image of damage in a home and wherein the surface comprises one of: a wall, a ceiling, and a floor.

15. The method of claim 14, further comprising:
determining, by the image analysis and device control system, a damage size output comprising an indication of a size of the damage;
determining, by the image analysis and device control system, using the one or more machine learning algorithms, based on the damage size output, and based on a type of the damage, an estimated cost to repair the damage;
determining, by the image analysis and device control system and based on the estimated cost to repair the damage, a settlement output comprising an automated settlement amount; and
transmitting, by the image analysis and device control system and to the mobile device, an instruction to cause display of the settlement output.

16. The method of claim 15, wherein the determining the estimated cost comprises comparing, by the image analysis and device control system and using the one or more machine learning algorithms, the damage to other previously determined instances of damage and repair costs associated with each of the other previously determined instances of damage.

17. The method of claim 15, further comprising:
determining, by the image analysis and device control system and based on the type of the damage, repair service recommendations and availability;
transmitting, by the image analysis and device control system and to the mobile device, a repair output comprising an indication of the repair service recommendations and availability; and
transmitting, by the image analysis and device control system, to the mobile device, and along with the repair output, an instruction to cause display of the repair service recommendations and availability.

18. The method of claim 15, wherein the determining, by the image analysis and device control system, the damage size output further comprises:
transmitting, by the image analysis and device control system and to the mobile device, an instruction to display the at least one image and to display a prompt for a user to trace an outline of the damage;
receiving, by the image analysis and device control system, from the mobile device, and responsive to transmitting the instruction to display the at least one image and to display the prompt, a marked version of the at least one image, wherein the marked version comprises the at least one image with the outline drawn around the damage;
determining, by the image analysis and device control system, an amount of pixels comprising dimensions of the damage; and
determining, by the image analysis and device control system and based on the amount of pixels and the ratio output, the damage size output.

19. An image analysis and device control system comprising:
a memory; and
a processor coupled to the memory and programmed with computer-executable instructions for performing steps comprising:
transmitting, to a mobile device, an instruction to capture at least one image;
receiving, from the mobile device, the at least one image;
determining, using one or more machine learning algorithms, a standardized reference object output comprising an indication that the at least one image comprises a standardized reference object, wherein the determining the standardized reference object output comprises:
determining, using the one or more machine learning algorithms, a plurality of bounding boxes comprising the at least one image, wherein determining the plurality of bounding boxes includes adjusting dimensions of the plurality of bounding boxes to match predetermined dimensions for a neural network, and
inputting, into the neural network, the plurality of bounding boxes for analysis by the one or more machine learning algorithms to determine whether the at least one image comprises the standardized reference object;
determining, based on an actual standardized reference object dimension output and a standardized reference object pixel dimension output, a ratio output comprising a correlation between the actual standardized reference object dimension output and the standardized reference object pixel dimension output;
determining, using edge detection, a surface boundary output comprising an indication of boundaries of a surface comprising the standardized reference object;
determining a surface pixel dimension output comprising pixel dimensions for the surface;
determining, based on the ratio output and the surface pixel dimension output, an actual surface dimension output comprising actual dimensions for the surface; and
transmitting, to the mobile device, the actual surface dimension output.

20. A non-transitory computer-readable medium storing computer executable instructions, which when executed by a processor, cause an image analysis and device control system to perform steps comprising:
transmitting, to a mobile device, an instruction to capture at least one image;
receiving, from the mobile device, the at least one image;
determining, using one or more machine learning algorithms, a standardized reference object output comprising an indication that the at least one image comprises a standardized reference object, wherein the determining the standardized reference object output comprises:
determining, using the one or more machine learning algorithms, a plurality of bounding boxes comprising the at least one image, wherein determining the plurality of bounding boxes includes adjusting dimensions of the plurality of bounding boxes to match predetermined dimensions for a neural network, and
inputting, into the neural network, the plurality of bounding boxes for analysis by the one or more machine learning algorithms to determine whether the at least one image comprises the standardized reference object;

determining, based on an actual standardized reference object dimension output and a standardized reference object pixel dimension output, a ratio output comprising a correlation between the actual standardized reference object dimension output and the standardized reference object pixel dimension output;

determining, using edge detection, a surface boundary output comprising an indication of boundaries of a surface comprising the standardized reference object;

determining a surface pixel dimension output comprising pixel dimensions for the surface;

determining, based on the ratio output and the surface pixel dimension output, an actual surface dimension output comprising actual dimensions for the surface; and transmitting, to the mobile device, the actual surface dimension output.

\* \* \* \* \*